United States Patent
Kimura et al.

(10) Patent No.: US 8,315,319 B2
(45) Date of Patent: Nov. 20, 2012

(54) TRANSMITTER, MULTICARRIER TRANSMITTING METHOD, AND RECEIVER

(75) Inventors: Tomohiro Kimura, Osaka (JP); Kenichiro Hayashi, Kyoto (JP)

(73) Assignee: Panasonic Corporation, Osaka (JP)

( * ) Notice: Subject to any disclaimer, the term of this patent is extended or adjusted under 35 U.S.C. 154(b) by 431 days.

(21) Appl. No.: 12/599,564

(22) PCT Filed: May 27, 2008

(86) PCT No.: PCT/JP2008/001319
§ 371 (c)(1),
(2), (4) Date: Nov. 10, 2009

(87) PCT Pub. No.: WO2008/149510
PCT Pub. Date: Dec. 11, 2008

(65) Prior Publication Data
US 2011/0249772 A1      Oct. 13, 2011

(30) Foreign Application Priority Data
May 30, 2007 (JP) .............................. 2007-143244

(51) Int. Cl.
*H04K 1/10* (2006.01)
(52) U.S. Cl. ....................... 375/260; 375/267
(58) Field of Classification Search .............. 375/260, 375/267; 370/328
See application file for complete search history.

(56) References Cited

U.S. PATENT DOCUMENTS

| | | | |
|---|---|---|---|
| 5,771,224 A | 6/1998 | Seki et al. | |
| 2007/0263737 A1* | 11/2007 | Li et al. | 375/260 |
| 2007/0263743 A1* | 11/2007 | Lee et al. | 375/267 |
| 2008/0152028 A1* | 6/2008 | Futaki et al. | 375/260 |
| 2011/0051657 A1* | 3/2011 | Li et al. | 370/328 |

FOREIGN PATENT DOCUMENTS

| | | |
|---|---|---|
| JP | 7-321765 | 12/1995 |
| JP | 8-265293 | 10/1996 |
| JP | 2005-260342 | 9/2005 |
| JP | 2005-277716 | 10/2005 |
| JP | 2005-304082 | 10/2005 |

OTHER PUBLICATIONS

International Search Report issued Sep. 2, 2008 in International (PCT) Application No. PCT/JP2008/001319.
ETSI EN 300 744 V 1.5.1(Nov. 2004), pp. 7-8 and pp. 25-34.

* cited by examiner

*Primary Examiner* — Emmanuel Bayard
(74) *Attorney, Agent, or Firm* — Wenderoth, Lind & Ponack, L.L.P.

(57) ABSTRACT

A transmitter modulates for each symbol period a plurality of carriers that include a carrier group that consists of a plurality of prescribed carriers, and repeatedly transmits control information in cycles by using the carrier group. The transmitter transmits multiple-bit binary data of the control information in each symbol period, thereby transmitting the control information once in each of the cycles that includes at least one symbol period. The transmitter controls the transmission unit to switch, within the carrier group, for each of the cycles, carriers of bits of the control information, according to a prescribed rule.

10 Claims, 5 Drawing Sheets

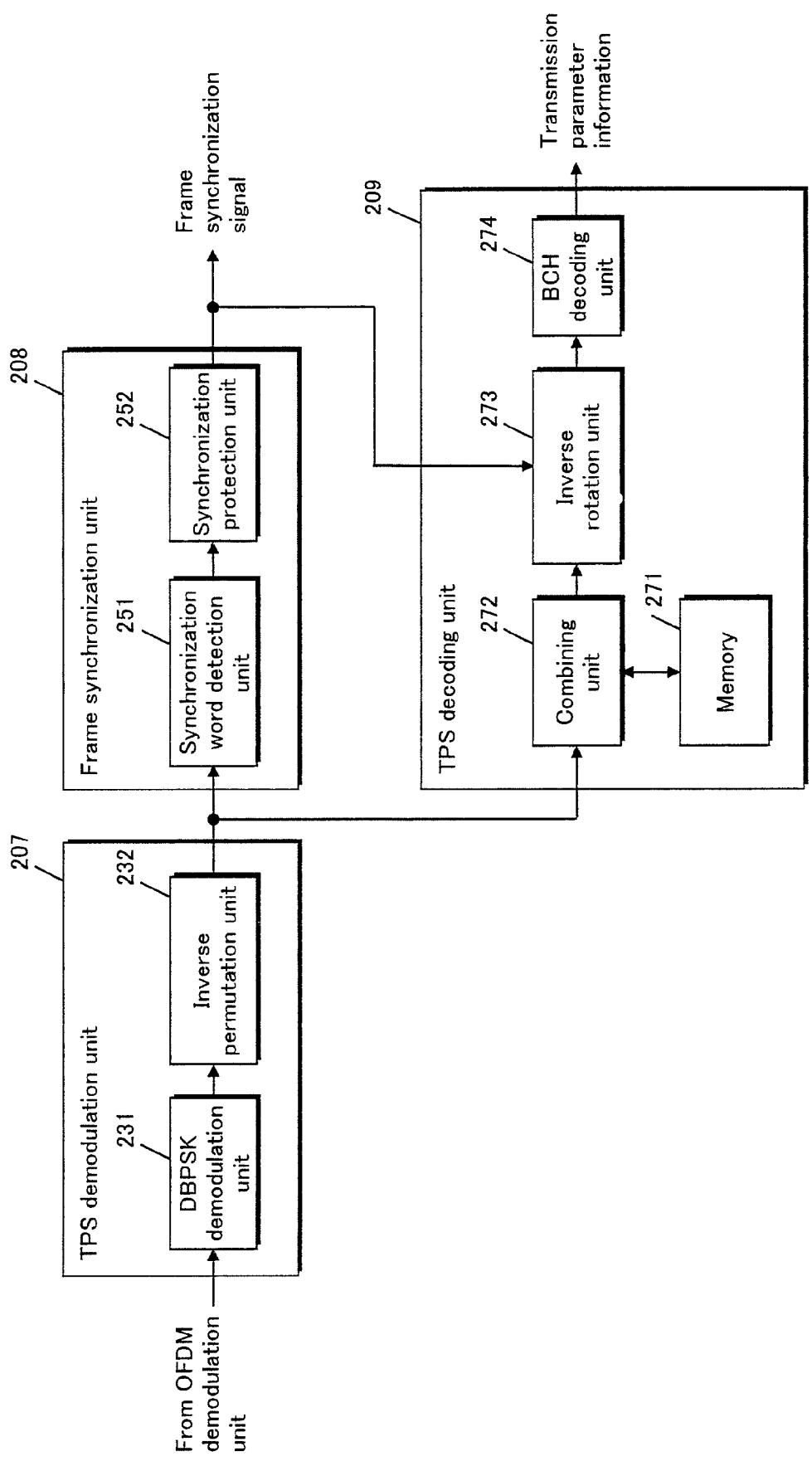

US 8,315,319 B2

TRANSMITTER, MULTICARRIER TRANSMITTING METHOD, AND RECEIVER

TECHNICAL FIELD

The present invention relates to a technique to receive and transmit transmission parameter information and so on for use in multicarrier transmission.

BACKGROUND ART

As an OFDM (Orthogonal Frequency Division Multiplexing) transmission method currently being used in the terrestrial digital television broadcast, there is a transmission method standardized in ETSI EN 300 744 issued by the European Telecommunication Standards Institute (see Non-patent Document 1). This standard defines a transmission method for digital video broadcast, which is called DVB-T (Digital Video Broadcasting Terrestrial) standard. Note that the OFDM transmission method is a type of multicarrier transmission methods for performing digital modulation on each of carriers and multiplexing the modulated carriers.

The following shows the overview of the OFDM transmission method based on the DVB-T standard.

The DVB-T standard includes three transmission modes, namely the 2K mode, the 4K mode and the 8K mode. The number of carries used in the OFDM transmission is different for each mode. Specifically, the number of carries used in the 2K mode, the 4K mode and the 8K mode is 1705, 3409 and 6817, respectively. Also, according to the DVB-T standard, a unit time for performing the digital modulation based on the OFDM transmission is called an OFDM symbol. 68 OFDM symbols constitute a frame, and four frames (272 OFDM symbols) constitute a super frame.

According to the DVB-T standard, TPS (Transmission Parameter Signalling) signals for use in notification of transmission parameter information, and two types of reference signals, namely scattered pilot signals (hereinafter called "SP signals") and continual pilot signals (hereinafter called "CP signals"), are transmitted in addition to the main stream that is chiefly used for transmitting video information. The DVB-T standard allows the transmission parameter information to be set in several patterns, for control of the transmission speed and the robustness of the main stream. The transmitter uses the TPS signals to notify the receiver of the transmission parameter information. The receiver is capable of estimating the channel characteristics, based on the SP signals and the CP signals.

The TPS signals mentioned above are transmitted by carriers that are arranged at prescribed frequencies. Each of the carriers used for the transmission of the TPS signals is called "a TPS carrier". The number of the TPS carriers used for the transmission of the TPS signals in the 2K mode, the 4K mode and the 8K mode is 17, 34 and 68, respectively. The TPS carriers included in a single OFDM symbol transmit the same bits of the transmission parameter information and so on in parallel. The transmission parameter information has been modulated with the DBPSK (Differential Binary Phase Shift Keying) method. Each OFDM symbol transmits one-bit binary data of the transmission parameter information and so on.

A block including a series of TPS signals for transmitting the transmission parameter information and so on is called a TPS block. In conventional techniques, the TPS block includes 68 TPS signals, and is to be carried by TPS carriers that are included in a single frame (68 OFDM symbols) and have an identical carrier number.

Each TPS block is 68-bit binary data, which includes one initialization bit $s_0$, 16 synchronization word bits $s_1$-$s_{16}$, 37 transmission parameter information bits $s_{17}$-$s_{53}$, and 14 redundancy bits $s_{54}$-$s_{67}$ for error protection. The initialization bit $s_0$ is used for initialization of the modulation phase of the DBPSK. The synchronization words $s_1$-$s_{16}$ are reflected codes consisted of "0011010111101110" or "1100101000010001", and are used for frame synchronization in the receiver. The transmission parameter information bits $s_{17}$-$s_{53}$ includes Length indicator showing the length of information included in the transmission parameter information bits $s_{17}$-$s_{53}$, Frame number, Constellation (i.e. the modulation method for the data transmission carriers), Hierarchy information, Code rates for channel coding, Guard intervals for the OFDM transmission, Transmission mode, Cell ID, and reserved bits. The redundancy bits $s_{54}$-$s_{67}$ are redundancy codes that have been coded with shortened BCH code (67, 53) with respect to the synchronization word bits $s_1$-$s_{16}$ and the transmission parameter information bits $s_{17}$-$s_{53}$. The receiver is capable of correcting transmission errors of up to 2 bits by using the shortened BCH code (67, 53).

A receiver pertaining to the DVB-T standard acquires the transmission parameter information carried by the TPS signals, and identifies the transmission method (the Constellation, the Hierarchy information, the Code rates for the channel coding, etc.) based on the acquired transmission parameter information. As a result, the receiver can demodulate and decode the main stream. Since the transmission parameter information is important for the demodulation and the decoding of the main stream, the TPS signals have been designed to be robust. For example, since the TPS carriers transmit the same bits included in the TPS block in parallel, the receiver can prevent reception errors by combine and demodulate the same bits included in the TPS block carried by the plurality of TPS carriers. Also, since the TPS signals are carried by the plurality of TPS carriers, the TPS signals have the frequency diversity effect and the robustness against the frequency selective fading.

The receiver establishes the frame synchronization by detecting that the synchronization words $s_1$-$s_{16}$ are reflective between each two successive frames. Note that the reflective structure of the synchronization words $s_1$-$s_{16}$ prevents that the frame synchronization is established at an incorrect position even though other data carried by the TPS signals bears a resemblance to the synchronization words.

On the other hand, as a DVB-T-based transmission method for use by mobile terminal apparatuses, DVB-H (Digital Video Broadcasting Handheld) has been standardized. According to the DVB-H standard, the main stream is intermittently multiplexed in DVB-T-based transmissions, and the receiver intermittently receives the main stream. As a result, the DVB-H standard can reduces the power consumption by the receiver.

Non-patent Document 1: ETSI EN 300 744

DISCLOSURE OF THE INVENTION

Problems to be Solved by the Invention

However, with the OFDM transmission method explained above, the receiver is required to receive TPS signals of one or more frames to identify the transmission parameter information based on the TPS signals. Since the receiver starts the demodulation of the main stream after identifying the transmission parameter information, the starting of the demodulation of the main stream might be delayed at the starting of the channel tuning or the like. In the same manner, since the receiver is required to have a protection duration for one or more frames to detect the reflected codes of the synchronization words, the establishment of the frame synchronization might be delayed at the starting of the channel tuning or the like.

Also, even in the case of a receiver that performs intermittent reception as the receiver of the DVB-H standard, it is necessary to perform continuous reception of one or more frames at the starting of channel tuning and reacquisition of the transmission parameter information.

Moreover, since the shortened BCH code (67, 53) used for error correction of the TPS block can correct up to 2 bits, the receiver might receive incorrect transmission parameter information if reception failure of 3 or more FDM symbols per frame is caused due to time-dependent change of the channels and impulse noises.

In view of the above, the present invention aims to provide a transmitter, a multicarrier transmission method, and a receiver that enable the receiver to acquire control information such as transmission parameter information in a short time or improves the transmission quality of the control information such as transmission parameter information.

Means for Solving the Problems

To solve the problems above, one aspect of the present invention provides a transmitter that modulates for each symbol period a plurality of carriers that include a carrier group that is consisted of a plurality of prescribed carriers, and repeatedly transmits control information in cycles by using the carrier group, the transmitter comprising: a transmission unit operable to transmit multiple-bit binary data of the control information in each symbol period, thereby transmitting the control information once in each of the cycles that includes at least one symbol period; and a transmission control unit operable to control the transmission unit to switch, within the carrier group, for each of the cycles, carriers of bits of the control information, according to a prescribed rule.

Another aspect of the present invention is a transmitter that modulates for each symbol period a plurality of carriers that include a carrier group that is consisted of a plurality of prescribed carriers, and repeatedly transmits control information in cycles by using the carrier group, the transmitter comprising: a transmission unit operable to transmit all bits of binary data of the control information in each symbol period, thereby transmitting the control information one or more times in each symbol period; and a transmission control unit operable to control the transmission unit to switch, within the carrier group, for each symbol period, carriers of bits of the control information, according to a prescribed rule.

Advantageous Effects of the Invention

According to the conventional art, only one-bit binary data of the control information (corresponding to the TPS block described above) is transmitted in the symbol period. On the other hand, each of the transmitters stated above transmits multiple bits of or all bits of the control information in the symbol period. Thus, each of the transmitters stated above can transmit the whole control information in a smaller number of symbol periods than the conventional art. Note that the receiver can receive the transmitted control information in a shorter time.

Further, since the bits of the control information are transmitted in a plurality of symbol periods while the carriers used for the transmission are shifted, it is possible to achieve the diversity effects for the control information with respect to both the frequency direction and the time direction. As a result, it is possible to improve the transmission quality of the control information.

In the transmitters stated above, the prescribed rule may be to cyclically shift the carriers of the bits of the control information for each of the cycles. Alternatively, the prescribed rule may be to cyclically shift all or part of the carriers of the bits of the control information for each symbol period.

The transmitter with the stated structure can improve the transmission quality of the control information.

In the transmitters stated above, the prescribed rule may include a first rule that is to cyclically shift the carriers of the bits of the control information for each of the cycles, and a second rule that is common to each symbol period and is to rearrange, with respect to a frequency direction, the bits of the control information arranged according to the first rule. Alternatively, the prescribed rule may include a first rule that is to cyclically shift all or part of the carriers of the bits of the control information for each symbol period, and a second rule that is common to each symbol period and is to rearrange, with respect to a frequency direction, the bits of the control information arranged according to the first rule.

The transmitter with the stated structure can achieve a greater frequency diversity effects, and further improve the transmission quality of the control information.

Another aspect of the present invention is a multicarrier transmission method for modulating for each symbol period a plurality of carriers that include a carrier group that is consisted of a plurality of prescribed carriers, and repeatedly transmits control information in cycles by using the carrier group, the multicarrier transmission method comprising: a transmission step of transmitting multiple-bit binary data of the control information in each symbol period, thereby transmitting the control information once in each of the cycles that includes at least one symbol period; and a transmission control step of controlling the transmission step to switch, within the carrier group, for each of the cycles, carriers of bits of the control information, according to a prescribed rule.

Another aspect of the present invention is a multicarrier transmission method for modulating for each symbol period a plurality of carriers that include a carrier group that is consisted of a plurality of prescribed carriers, and repeatedly transmits control information in cycles by using the carrier group, the multicarrier transmission method comprising: a transmission step of transmitting all bits of binary data of the control information in each symbol period, thereby transmitting the control information one or more times in each symbol period; and a transmission control step of controlling the transmission step to switch, within the carrier group, for each symbol period, carriers of bits of the control information, according to a prescribed rule.

According to the conventional art, only one-bit binary data of the control information (corresponding to the TPS block described above) is transmitted in the symbol period. On the other hand, each of the multicarrier transmission methods stated above transmits multiple bits of or all bits of the control information in the symbol period. Thus, each of the multicarrier transmission methods stated above can transmit the whole control information in a smaller number of symbol periods than the conventional art.

Further, since the bits of the control information are transmitted in a plurality of symbol periods while the carriers used for the transmission are shifted, it is possible to achieve the diversity effects for the control information with respect to both the frequency direction and the time direction. As a result, it is possible to improve the transmission quality of the control information.

Another aspect of the present invention is a receiver that receives control information from a transmitter that modulates for each symbol period a plurality of carriers that include a carrier group that is consisted of a plurality of prescribed carriers and repeatedly transmits the control information in cycles by using the carrier group, the receiver comprising: a receiving unit operable to receive the control information that is transmitted in such a manner that multiple-bit binary data of the control information is transmitted in each symbol period so that the control information is transmitted once in each of the cycles that includes a prescribed number of symbol periods, wherein transmission of the control information is controlled such that carriers of bits of the control information are switched within the carrier group, for each of the cycles, according to a prescribed rule; and a reconstructing unit operable to reconstruct the control information received by the receiving unit, according to the prescribed rule.

Another aspect of the present invention is a receiver that receives control information from a transmitter that modulates for each symbol period a plurality of carriers that include a carrier group that is consisted of a plurality of prescribed carriers and repeatedly transmits control information in cycles by using the carrier group, the receiver comprising: a receiving unit operable to receive the control information that is transmitted in such a manner that all bits of binary data of the control information is transmitted in each symbol period so that the control information is transmitted one or more times in each symbol period, wherein transmission of the control information is controlled such that carriers of bits of the control information are switched within the carrier group, for each symbol period, according to a prescribed rule; and a reconstructing unit operable to reconstruct the control information received by the receiving unit, according to the prescribed rule.

According to the conventional art, only one-bit binary data of the control information (corresponding to the TPS block described above) is received in the symbol period. On the other hand, each of the receivers stated above receives multiple bits of or all bits of the control information in the symbol period. Thus, each of the receivers stated above can receive the whole control information in a smaller number of symbol periods than the conventional art. Also, the receiver can receive the transmitted control information in a shorter time.

Further, since the bits of the control information are transmitted in a plurality of symbol periods while the carriers used for the transmission are shifted, it is possible to achieve the diversity effects for the control information with respect to both the frequency direction and the time direction. As a result, it is possible to improve the transmission quality of the control information.

BRIEF DESCRIPTION OF THE DRAWINGS

FIG. 5 shows the structures of a TPS demodulation unit, a frame synchronization unit and a TPS decoding unit depicted in FIG. 4.

EXPLANATION OF REFERENCES

Figure 1:
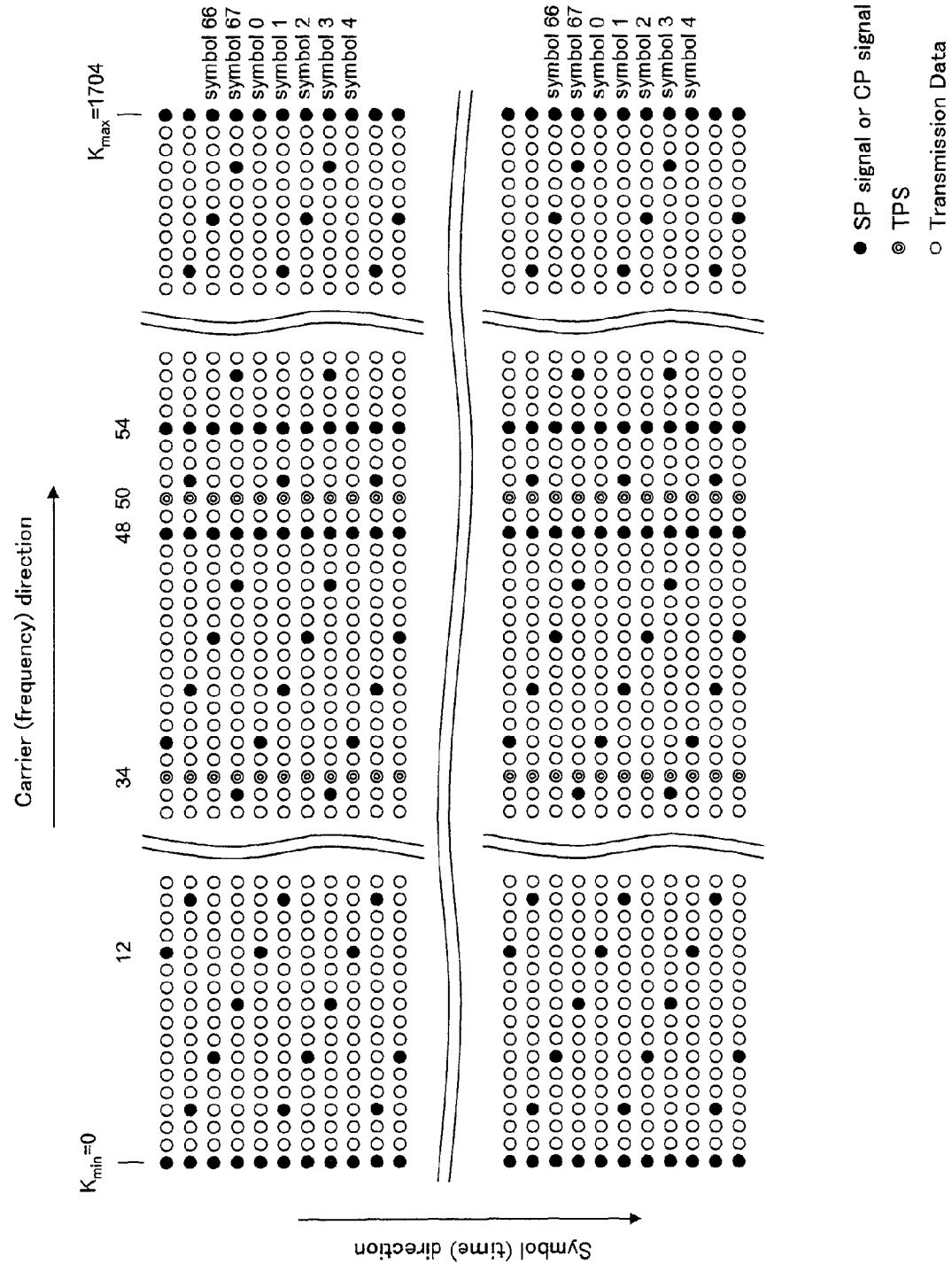
FIG. 1 example signal positions of SP signals, CP signals and TPS signals.

100 Transmitter
101, 105 Energy dispersal unit
102, 106 Outer coding unit
103, 107 Outer interleaver
104, 108 Inner coding unit
109 Inner interleaver
110 TPS signal generation unit
111 Pilot generation unit
112 Mapping unit
113 Frame adaptation unit
114 OFDM modulation unit
115 Guard interval insertion unit
116 D/A conversion unit
117 Front-end unit
118 Antenna
151 TPS block generation unit
152 Rotation unit
153 Permutation unit
201 Antenna
202 Front-end unit
203 A/D conversion unit
204 AFC unit
205 Symbol synchronization unit
206 OFDM demodulation unit
207 TPS demodulation unit
208 Frame synchronization unit
209 TPS decoding unit
210 Equalizing unit
211 De-mapping unit
212 Inner de-interleaver
213, 217 Inner decoding unit
214, 218 Outer de-interleaver
215, 219 Outer decoding unit
216, 220 Energy dispersal unit
231 DBPSK demodulation unit
232 Inverse permutation unit
251 Synchronization word detection unit
252 Synchronization protection unit
271 Memory
272 Combining unit
273 Inverse rotation unit
274 BCH decoding unit

BEST MODE FOR CARRYING OUT THE INVENTION

The following explains an embodiment of the present invention with reference to the drawings. Note that this embodiment is explained based on an example of a multicarrier transmission method for transmitting video information and audio information coded into a transport stream. Information to be transmitted is not limited to video and audio information.

<<Frame Structure Pertaining to OFDM>>

Before explanation of the transmitter and the receiver pertaining to the present invention, the following explains the frame structure pertaining to the OFDM. According to the multicarrier transmission method pertaining to the present embodiment, 68 OFDM symbols that are consecutive in terms of time constitute a single frame, and four frames that are consecutive in terms of time constitute a single super frame. Note that OFDM symbol is a unit time for performing the digital modulation based on the OFDM transmission.

68 OFDM symbols included in a frame are indexed with use of a symbol number n (n is an integer satisfying 0≦n≦67).

A single OFDM symbol is consisted of a plurality of carriers. The number of carriers constituting an OFDM symbol is different depending on the transmission mode. For example, the number of carriers constituting an OFDM symbol in the 2K mode, the 4K mode, the 8K mode, the 16K mode and the 32K mode is 1705, 3409, 6817, 13633 and 27265, respectively. The carriers are indexed with use of a carrier number k (k is an integer satisfying $K_{min} \leq k \leq K_{max}$). Assume that the minimum carrier number $K_{min}$ is 0. If this is the case, the maximum carrier number $K_{max}$ in the 2K mode, the 4K mode, the 8K mode, the 16K mode and the 32K mode is 1704, 3408, 6816, 13632 and 27264, respectively.

A single carrier in a single OFDM symbol period is called a cell, and a single cell carries a single modulation symbol. A single OFDM symbol is transmitted in a period having a symbol duration $T_S$. The symbol duration $T_S$ is consisted of a useful symbol duration $T_U$ and a redundant duration $\Delta$ which is called a guard interval. In this case, the frequency interval between adjoining carriers is $1/T_U$.

An OFDM frame includes a scattered pilot signals (SP signals), continual pilot signals (CP signals) and TPS signals, as well as the transmission data. The following explains carriers for use in transmission of the SP signals, the CP signals and the TPS signals, in order.

<Carriers for Transmitting SP Signals>

In a symbol with a symbol number n, SP signals are transmitted by a plurality of carriers belonging to a subset of carrier numbers given by the [Math. 1] below.

$$\{k=K_{min}+3\times(n \bmod 4)+12p\,|\,p \text{ integer}, p\geq 0, k\epsilon[K_{min}; K_{max}]\}$$ [Math. 1]

Note that the variable p in the [Math. 1] is an integer satisfying $p \geq 0$. Also, k is within a range of $K_{min} \leq k \leq K_{max}$. The value of $K_{max}$ varies depending on the transmission mode. The example values of the $K_{min}$ and $K_{max}$ are as described above. The sign mod expresses a modulus operator.

<Carriers for Transmitting CP Signals>

CP signals are transmitted by a plurality of carriers belonging to a subset of carrier numbers given by $k=k_{CP}+1704p$ with respect to each carrier number $k_{CP}$ shown in [Table 1] below. Note that p is an integer satisfying $p \geq 0$. Also, k is within a range of $K_{min} \leq k \leq K_{max}$. The value of $K_{max}$ varies depending on the transmission mode. The example values of $K_{min}$ and $K_{max}$ are as described above. That is, the carrier numbers of the carriers included in the subset for transmitting the CP signals are equivalent to carrier numbers obtainable through repeating the 1704-carrier cycles with respect to each carrier number shown in the [Table 1] below up to $K_{max}$.

The number of carriers for transmitting CP signals in the 2K mode, the 4K mode, the 8K mode, the 16K mode and the 32K mode is 45, 89, 177, 353 and 705, respectively. Note that some of the cells for transmitting CP signals are the same as the cells for transmitting SP signals. The number of the cells for transmitting CP signals except for the cells that are the same as the cells for transmitting SP signals (i.e. the number of carriers per symbol) in the 2K mode, the 4K mode, the 8K mode, the 16K mode and the 32K mode is 33, 66, 132, 264 and 528, respectively.

TABLE 1

Continual pilot carrier positions
(Carrier number $k_{CP}$)

| 0 | 48 | 54 | 87 | 141 | 156 | 192 | 201 | 255 |
|---|---|---|---|---|---|---|---|---|
| 279 | 282 | 333 | 432 | 450 | 483 | 525 | 531 | 618 |
| 636 | 714 | 759 | 765 | 780 | 804 | 873 | 888 | 918 |
| 939 | 942 | 969 | 984 | 1050 | 1101 | 1107 | 1110 | 1137 |
| 1140 | 1146 | 1206 | 1269 | 1323 | 1377 | 1491 | 1683 | 1704 |

<Carriers for Transmitting TPS Signals>

TPS signals are transmitted by a plurality of carriers included in a subset of carrier numbers given by $k=k_{TPS}(j)$. j is an index (hereinafter called "TPS carrier index") that specifies a carrier number $k_{TPS}(j)$ of a TPS carrier. In the case the TPS carrier index j is within a range of 0 j<16, the carrier number $k_{TPS}$ $k_{TPS}(j)$ is determined as [Table 2] below shows. In the case the TPS carrier index j is j≧17, the carrier number $k_{TPS}(j)$ is given by a recurrence equation $k_{TPS}(j)=k_{TPS}(j-17)+1704$. The TPS carrier index j in the 2K mode is an integer satisfying 0≦j≦16. The TPS carrier index j in the 4K mode is an integer satisfying 0≦j≦33. The TPS carrier index j in the 8K mode is an integer satisfying 0≦j≦67. The TPS carrier index j in the 16K mode is an integer satisfying 0≦j≦135. The TPS carrier index j in the 16K mode is an integer satisfying 0≦j≦271.

That is, the carrier numbers of the carriers included in the subset for transmitting the TPS signals are equivalent to carrier numbers obtainable through repeating the 1704-carrier cycles with respect to each carrier number shown in the [Table 2] below up to $K_{max}$. Note that the value of $K_{max}$ varies depending on the transmission mode. The example value of $K_{max}$ is as described above.

The number of TPS carriers for transmitting TPS signals in the 2K mode, the 4K mode, the 8K mode, the 16K mode and the 32K mode is 17, 34, 68, 136 and 272, respectively.

TABLE 2

| j | TPS carrier positions (Carrier number $k_{TPS}(j)$) |
|---|---|
| 0 | 34 |
| 1 | 50 |
| 2 | 209 |
| 3 | 346 |
| 4 | 413 |
| 5 | 569 |
| 6 | 595 |
| 7 | 688 |
| 8 | 790 |
| 9 | 901 |
| 10 | 1073 |
| 11 | 1219 |
| 12 | 1262 |
| 13 | 1286 |
| 14 | 1469 |
| 15 | 1594 |
| 16 | 1687 |

FIG. 1 shows example signal positions of SP signals, CP signals and TPS signals. FIG. 1 shows the signal positions in the 2K mode. The filled circles represent SP signals or CP signals. The double circles represent TPS signals. The open circles represent transmission data.

<<Contents of TPS Block>>

Next, the following explains the contents of a block of a series of TPS signals (i.e. TPS block) for transmitting the transmission parameter information and so on. In the following explanation, the suffix s and the suffixes s' and s" described later represent the positions of the bits included in the TPS block.

Each TPS block is 68-bit binary data, which includes 1 initialization bit $s_0$, 16 synchronization word bits $s_1$-$s_{16}$, 37 transmission parameter information bits $s_{17}$-$s_{53}$, and 14 redundancy bits $s_{54}$-$s_{67}$ for error protection. Each bit of binary data constituting the TPS block is transmitted by a single TPS signal.

The initialization bit $s_0$ is used for initialization of the modulation phase of the DBPSK. The synchronization words $s_1$-$s_{16}$ are reflected codes to which either "0011010111101110" or "1100101000010001" is allocated, and are used for frame synchronization in the receiver. The transmission parameter information bits $s_{17}$-$s_{53}$ includes Length indicator showing the length of information included in the transmission parameter information bits $s_{17}$-$s_{53}$, Frame number, Constellation (i.e. the modulation method for the data transmission carriers), Hierarchy information, Code rates for channel coding, Guard intervals for the OFDM transmission, Transmission mode, Cell ID, and reserved bits. The redundancy bits $s_{54}$ $s_{67}$ are redundancy codes that have been coded with shortened BCH code (67, 53) with respect to the synchronization word bits $s_1$-$s_{16}$ and the transmission parameter information bits $s_{17}$-$s_{53}$. The receiver is capable of correcting transmission errors of up to 2 bits by using the shortened BCH code (67, 53).

The following further explains the overview of TPS signals for use in the transmission of a single TPS block. According to the conventional art, a single TPS block including $s_0$ to $s_{67}$ is carried by 68 TPS signals in a single frame (68 OFDM symbols) that have the same carrier numbers. In other words, according to the conventional art, a single OFDM symbol carries only one bit of the bits $s_0$-$s_{67}$ of a TPS block.

In the present embodiment, in the case of the 2K mode, since a single OFDM symbol includes 17 TPS signals, four OFDM symbols include 68 TPS signals. The number of TPS signals included in four OFDM symbols is the same as the number of bits s0-s67 of a TPS block. In view of this, the transmitter uses a single OFDM symbol to transmit 17 bits from among the bits $s_0$-$s_{67}$ of a TPS block, and uses four OFDM symbols to transmit each TPS block s0-s67.

In the case of the 4K mode, a single OFDM symbol includes 34 TPS signals, and two OFDM symbols include 68 TPS signals. The number of TPS signals included in two OFDM symbols is the same as the number of bits s0-s67 of a TPS block. In view of this, the transmitter uses a single OFDM symbol to transmit 34 bits from among the bits $s_0$-$s_{67}$ of a TPS block, and uses two OFDM symbols to transmit each TPS block s0-s67.

In the case of the 8K mode, since a single OFDM symbol includes 68 TPS signals, the number of TPS signals included in a single OFDM symbol is the same as the number of bits s0-s67 of a TPS block. In view of this, the transmitter uses a single OFDM symbol to transmit all the bits $s_0$-$s_{67}$ of a TPS block, and uses a single OFDM symbol to transmit each TPS block s0-s67.

In the case of the 16K mode, a single OFDM symbol includes 136 TPS signals, the number of TPS signals included in a single OFDM symbol is the same as the number of bits $s_0$-$s_{67}$ included in two TPS blocks. In view of this, the transmitter uses a single OFDM symbol to transmit all the bits $s_0$-$s_{67}$ of a TPS block, and uses a single OFDM symbol to transmit each TPS block s0-s67.

In the case of the 32K mode, a single OFDM symbol includes 272 TPS signals, the number of TPS signals included in a single OFDM symbol is the same as the number of bits $s_0$-$s_{67}$ included in four TPS blocks. In view of this, the transmitter uses a single OFDM symbol to transmit all the bits $s_0$-$s_{67}$ of a TPS block, and uses a single OFDM symbol to transmit each TPS block s0-s67.

<<Structure of Transmitter>>

Figure 2:
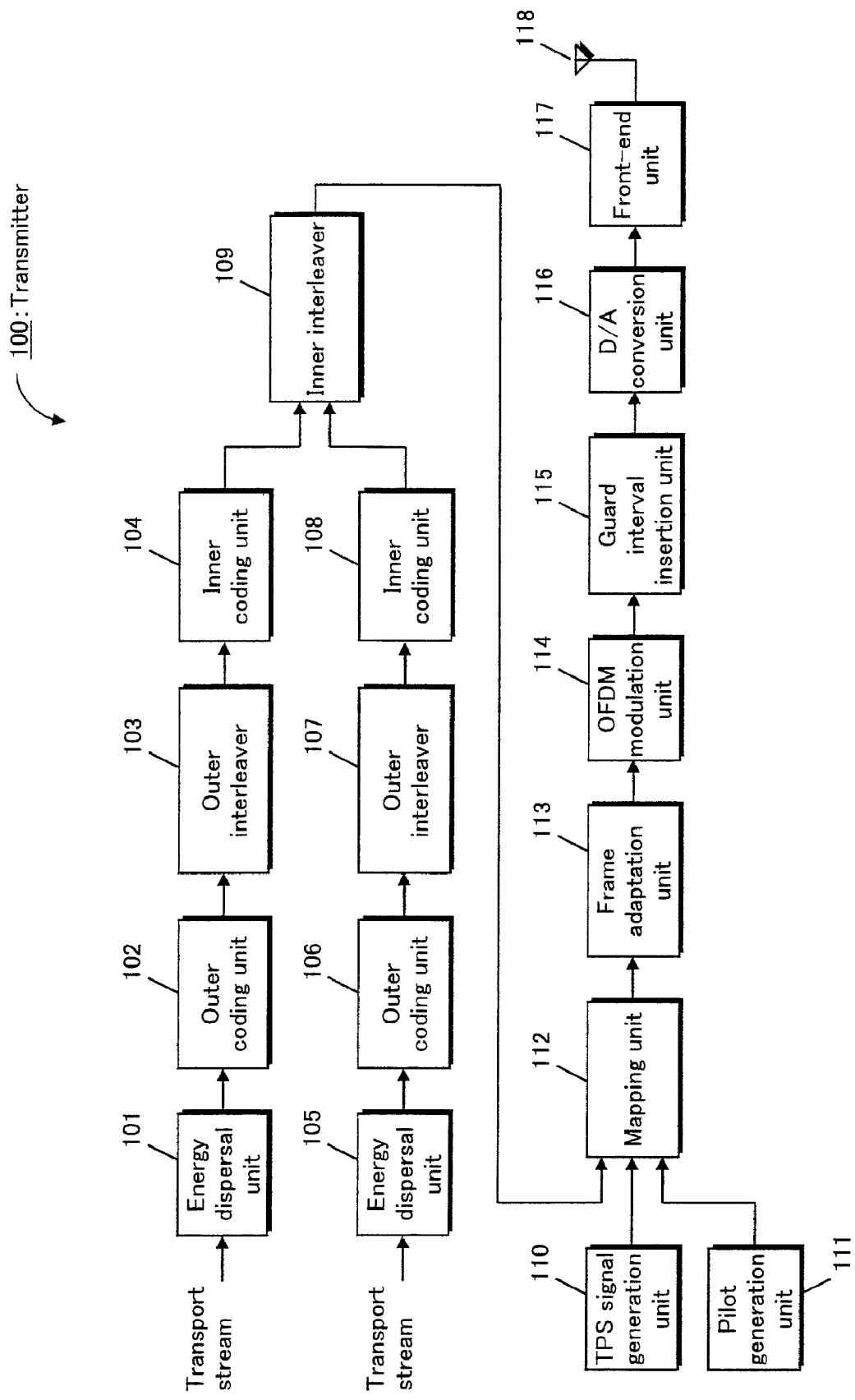
FIG. 2 shows the structure of a transmitter pertaining to an embodiment of the present invention.

The following explains the structure of the transmitter pertaining to the present embodiment, with reference to the drawings. FIG. 2 shows the structure of the transmitter pertaining to the present embodiment.

A transmitter 100 includes an energy dispersal unit 101, an outer coding unit 102, an outer interleaver 103, an inner coding unit 104, an energy dispersal unit 105, an outer coding unit 106, an outer interleaver 107, an inner coding unit 108, an inner interleaver 109, a TPS signal generation unit 110, a pilot generation unit 111, a mapping unit 112, a frame adaptation unit 113, an OFDM modulation unit 114, a guard interval insertion unit 115, a D/A conversion unit 116, a front-end unit 117 and an antenna 118. Note that the transmitter 100 is capable of multiplexing up to two series of transport streams.

<Energy Dispersal Unit 101>

A first series of transport stream (i.e. transmission data) input to the transmitter 100 is provided to the energy dispersal unit 101. Note that the first transport stream has a packet structure, in which each packet includes 188 bytes of the transport stream, and a synchronization byte is located at the beginning of each packet.

The energy dispersal unit 101 randomizes the transmission data included in the provided transport stream. Specifically, the energy dispersal unit 101 performs energy dispersal by inverting some of the bits of the transmission data included in the transport stream provided based on PRBS (Pseudorandom Binary Sequence) sequence data, and outputs the transmission data on which the energy dispersal has been performed to the outer coding unit 102. Note that the PRBS sequence data is generated by a generator polynomial $G(x)=x^{15}+x^{14}+1$. The unit of initialization of the PRBS sequence data is 8 packets.

<Outer Coding Unit 102>

Using the RS (Reed-Solomon) coding, the outer coding unit 102 codes the transmission data received from the energy dispersal unit 101, on which the energy dispersal has been performed. After that, the outer coding unit 102 restructures 204-byte transmission data obtained through the coding (including 188-byte transmission data on which the energy dispersal has been performed and 16-byte parity data following the 188-byte data) in the form of packets, and outputs the packets to the outer interleaver 103.

<Outer Interleaver 103>

The outer interleaver 103 performs convolutional interleaving of the transmission data received from the outer coding unit 102, which has been coded based on the RS coding. The depth of the convolutional interleaving (in terms of the byte width) is I=12. The outer interleaver 103 outputs the transmission data, on which the convolutional interleaving has been performed, to the inner coding unit 104.

<Inner Coding Unit 104>

The inner coding unit 104 codes the transmission data received from the outer interleaver 103, on which the convolutional interleaving has been performed, by using a convolutional code based on generator polynomials $G_1=171_{OCT}$ and $G_2=133_{OCT}$. After that, the inner coding unit 104 outputs the transmission data on which the convolutional interleaving has been performed to the inner interleaver 109, while puncturing (i.e. thinning) the data. In this way, the inner coding unit 104 performs the punctured convolutional coding with a variable code rate.

<Energy Dispersal Unit 105>

A second series of transport stream (i.e. transmission data) input to the transmitter 100 is provided to the energy dispersal unit 105. Note that the second transport stream has a packet structure, in which each packet includes 188 bytes of the transport stream, and a synchronization byte is located at the beginning of each packet.

The energy dispersal unit 105 randomizes the transmission data included in the provided transport stream. Specifically, the energy dispersal unit 105 performs energy dispersal by inverting some of the bits of the transmission data included in the transport stream provided based on PRBS (Pseudorandom Binary Sequence) sequence data, and outputs the transmission data on which the energy dispersal has been performed to the outer coding unit 106. Note that the PRBS sequence data is generated by a generator polynomial $G(x)=x^{15}+x^{14}+1$. The unit of initialization of the PRBS sequence data is 8 packets.

<Outer Coding Unit 106>

Using the RS (Reed-Solomon) coding, the outer coding unit 106 codes the transmission data received from the energy dispersal unit 105, on which the energy dispersal has been performed. After that, the outer coding unit 106 restructures 204-byte transmission data obtained through the coding (including 188-byte transmission data on which the energy dispersal has been performed and 16-byte parity data following the 188-byte data) in the form of packets, and outputs the packets to the outer interleaver 107.

<Outer Interleaver 107>

The outer interleaver 107 performs convolutional interleaving of the transmission data received from the outer coding unit 106, which has been coded based on the RS coding. The depth of the convolutional interleaving (in terms of the byte width) is I=12. The outer interleaver 107 outputs the transmission data, on which the convolutional interleaving has been performed, to the inner coding unit 108.

<Inner Coding Unit 108>

The inner coding unit 108 codes the transmission data received from the outer interleaver 107, on which the convolutional interleaving has been performed, by using a convolutional code based on generator polynomials $G_1=171_{OCT}$ and $G_2=133_{OCT}$. After that, the inner coding unit 108 outputs the transmission data on which the convolutional interleaving has been performed to the inner interleaver 109, while puncturing (i.e. thinning) the data. In this way, the inner coding unit 108 performs the punctured convolutional coding with a variable code rate.

<Inner Interleaver 109>

The inner interleaver 109 interleaves in two phases the transmission data received from the inner coding unit 104, on which the punctured convolutional coding has been performed, and the transmission data received from the inner coding unit 108, on which the punctured convolutional coding has been performed. After that, the inner interleaver 109 outputs the transmission data on which the interleaving has been performed to the mapping unit 112. Note that the first-phase interleaving by the inner interleaver 109 is called bit width interleaving, which is performed for interleaving the data in terms of the bit width. The second-phase interleaving performed by the inner interleaver 109 is called symbol interleaving, which is performed for interleaving the data resultant from the bit width interleaving, in units of symbols each grouping a plurality of bits of the resultant transmission data. Note that the symbols mentioned here are units of generation of modulation symbols performed by the mapping unit 112.

<TPS Signal Generation Unit 110>

The TPS signal generation unit 110 generates a TPS block $s_0$-$s_{67}$ including the transmission parameter information, rearranges the generated TPS block $s_0$-$s_{67}$, according to a prescribed rule, and outputs a TPS block $s''_0$-$s''_{67}$ resultant from the rearrangement to the mapping unit 112. The rearrangement of the binary data according to the prescribed rule is performed by a rotation unit 152 and a permutation unit 153, which will be explained later.

Figure 3:
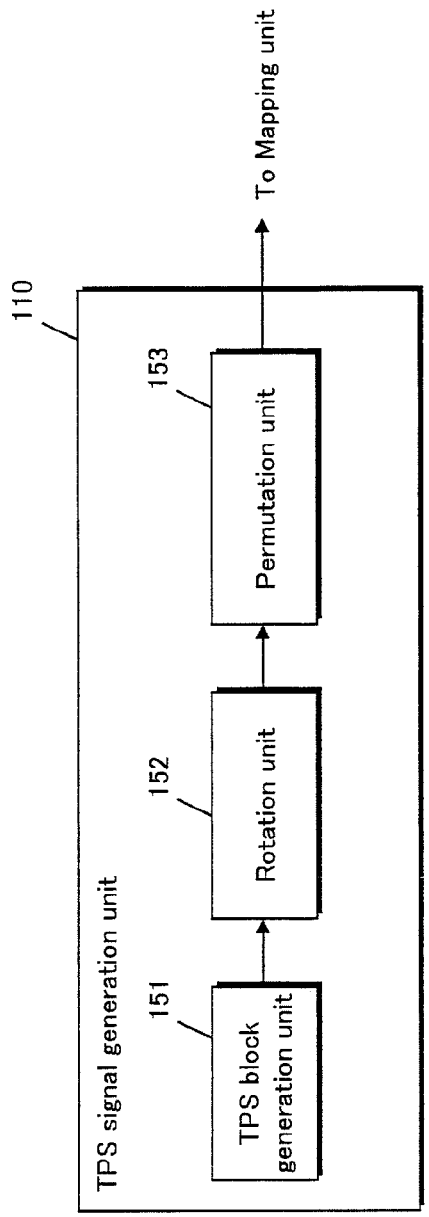
FIG. 3 shows the structure of a TPS signal generation unit depicted in FIG. 2.

The following explains the structure of the TPS signal generation unit 110 of FIG. 2, with reference to FIG. 3. FIG. 3 shows the structure of the TPS signal generation unit 110 of FIG. 2.

The TPS signal generation unit 110 includes a TPS block generation unit 151, a rotation unit 152 and a permutation unit 153.

[TPS Block Generation Unit 151]

The TPS block generation unit 151 generates a TPS block $s_0$-$s_{67}$, including 1 initialization bit $s_0$, 16 synchronization word bits $s_1$-$s_{16}$, 37 transmission parameter information bits $s_{17}$-$s_{53}$ which has been set by the transmitter 100 and 14 redundancy bits $s_{54}$-$s_{67}$ for error protection, and outputs the generated TPS block $s_0$-$s_{67}$ to the rotation unit 152. The meanings of the initialization bit $s_0$, the synchronization word bits $s_1$-$s_{16}$, the transmission parameter information bits $s_{17}$-$s_{53}$ and the redundancy bits $s_{54}$-$s_{67}$ are as explained above.

Note, however, that the TPS block generation unit 151 generates the same transmission parameter information $s_{17}$-$s_{53}$ within each single frame. Further, the TPS block generation unit 151 generates the synchronization words $s_1$-$s_{16}$ so as to be reflective even within each single frame. In the 16K mode and the 32K mode, the synchronization words $s_1$-$s_{16}$ are reflective within each OFDM symbol.

[Rotation Unit 152]

The rotation unit 152 rearranges the bits $s_0$-$s_{67}$ of the TPS block received from the TPS block generation unit 151 by cyclically performing bit shifting of some or all of the bits $s_0$-$s_{67}$ according to the following [Math. 2], and outputs a TPS block $s'_0$-$s'_{67}$ to resultant from the rearranging to the permutation unit 153.

$$s'_{R(i,n')} = s_i \quad \text{[Math. 2]}$$

In the [Math. 2], the variable i represents the position of a bit among the bits $s'_0$-$s'_{67}$ of a TPS block received from the TPS block generation unit 151, and n' represents the number of bits to be cyclically shifted. R(i,n') represents the rule for the rearrangement.

The arrangement rule R(i,n') is prepared for each transmission mode. The arrangement rule R(i,n') for the 2K mode is given by the [Math. 3] below. The arrangement rule R(i,n') for the 4K mode is given by the [Math. 4] below. The arrangement rule R(i,n') for the 8K mode, the 16K mode and the 32K mode is given by the [Math. 5] below.

$$R(i, n') = \begin{cases} (i+n') \bmod 17, & 0 \le i \le 16 \\ ((i+n') \bmod 17) + 17, & 17 \le i \le 33 \\ ((i+n') \bmod 17) + 34, & 34 \le i \le 50 \\ ((i+n') \bmod 17) + 51, & 51 \le i \le 67 \end{cases} \quad \text{[Math. 3]}$$

$$R(i, n') = \begin{cases} (i+n') \bmod 34, & 0 \le i \le 33 \\ ((i+n') \bmod 34) + 34, & 34 \le i \le 67 \end{cases} \quad \text{[Math. 4]}$$

$$R(i, n') = (i+n') \bmod 68, \quad 0 \le i \le 67 \quad \text{[Math. 5]}$$

In the [Math. 3], the [Math. 4] and the [Math. 5], the variable i represents the position of a bit among the bits $s_0$-$s_{67}$ of a TPS block received from the TPS block generation unit 151, and the variable n' represents the number of bits to be cyclically shifted. The sign mod expresses a modulus operator. R(i,n') represents the rule for the rearrangement. The bit number n' is initialized at the beginning of each frame.

The bit number n' in the [Math. 3] is incremented by one per every four OFDM symbols. For example, in the case of a TPS block $s_0$-$s_0$ carried by OFDM symbols having symbol numbers 0-3, the bit number n' is 0. In the case of a TPS block $s_0$-$s_{67}$ carried by OFDM symbols having symbol numbers 4-7, the bit number n' is 1. In the case of a TPS block $s_0$-$s_{67}$ carried by OFDM symbols having symbol numbers 8-11, the bit number n' is 2.

The bit number n' in the [Math. 4] is incremented by one per every two OFDM symbols. For example, in the case of a TPS block $s_0$-$s_0$ carried by OFDM symbols having symbol numbers 0-1, the bit number n' is 0. In the case of a TPS block $s_0$-$s_{67}$ carried by OFDM symbols having symbol numbers 2-3, the bit number n' is 1. In the case of a TPS block $s_0$-$s_{67}$ carried by OFDM symbols having symbol numbers 4-5, the bit number n' is 2.

The bit number n' in the [Math. 5] is incremented by one per every one OFDM symbol. For example, in the case of a TPS block $s_0$-$s_{67}$ carried by an OFDM symbol having a symbol number 0, the bit number n' is 0. In the case of a TPS block $s_0$-$s_{67}$ carried by an OFDM symbol having a symbol number 1, the bit number n' is 1. In the case of a TPS block $s_0$-$s_{67}$ carried by an OFDM symbol having a symbol number 2, the bit number n' is 2.

The following explains the rule R(i,n') for the rearrangement shown in [Math. 3], [Math. 4] and [Math. 5].

In the case of the rule R(i,n') for the 2K mode shown in [Math. 3], in view of the fact that the number of bits carried by a single OFDM symbol is 17, the rule R(i,n') cyclically shifts four 17-bit sub blocks $s_0$-$s_{16}$, $s_{17}$-$s_{33}$, $s_{34}$-$s_{50}$ and $s_{51}$-$s_{67}$ divided from a TPS block $s_0$-$s_{67}$ (Sub-blocks carried by a single OFDM symbol are hereinafter called "TPS sub-blocks"). The same rule for rearrangement is applied to each TPS sub-block. According to the stated rule, the rearrangement of the bits is not performed across different OFDM symbols included in the four OFDM symbols for carrying the bits of the TPS block $s_0$-$s_{67}$.

In the case of the rule R(i,n') for the 4K mode shown in [Math. 4], in view of the fact that the number of bits carried by a single OFDM symbol is 34, the rule R(i,n') cyclically shifts two 34-bit TPS sub blocks $s_0$-$s_{33}$ and $s_{34}$-$s_{67}$ divided from a TPS block $s_0$-$s_{67}$. The same rule for rearrangement applied to each TPS sub-block. According to the stated rule, the rearrangement of the bits is not performed across different OFDM symbols included in the two OFDM symbols for carrying the bits of the TPS block $s_0$-$s_{67}$.

In the case of the rule R(i,n') for the 8K mode, the 16K mode and the 32K mode shown in [Math. 5], in view of the fact that the number of bits carried by a single OFDM symbol is 68, 136 and 272 respectively, the rule R(i,n') cyclically shifts a TPS block $s_0$-$s_{67}$ without dividing it.

[Permutation Unit 153]

The permutation unit rearranges the bits of the TPS block $s'_0$-$s'_{67}$ received from the rotation unit 152 in a pseudo random manner according to the [Math. 6] shown below, and outputs TPS block $s''_0$-$s''_{67}$, resultant from the rearrangement, to the mapping unit 112.

$$S''_{P(i)} = s'_i \qquad \text{[Math. 6]}$$

In the [Math. 6], the variable i represents the position of a bit among the bits $s'_0$-$s'_{67}$ of a TPS block received from the rotation unit 152, and P(i) represents the rule for the rearrangement.

As [Math. 7] below shows, the rearrangement rule P(i) includes two steps for the rearrangement.

$$P(i) = P_2(P_1(i)) \qquad \text{[Math. 7]}$$

In the [Math. 7], the variable i represents the position of a bit among the bits $s'_0$-$s'_{67}$ of a TPS block received from the rotation unit 152.

The first step rearrangement rule $P_1(i)$ is common among all the transmission modes, and is by [Math. 8] below.

$$P_1(i) = \begin{cases} P_0(i), & 0 \le i \le 16 \\ P_0(i-17)+17, & 17 \le i \le 33 \\ P_0(i-34)+34, & 34 \le i \le 50 \\ P_0(i-51)+51, & 51 \le i \le 67 \end{cases} \qquad \text{[Math. 8]}$$

In the [Math. 8], the variable i represents the position of a bit among the bits $s'_0$-$s'_{67}$ of a TPS block received from the rotation unit 152, and $P_0(i)$ represents the rule for the rearrangement. The [Math. 8] represents that the bits $s'_0$-$s'_{67}$ of a TPS block is rearranged per 17 bits according. The following [Table 3] shows an example of the 17-bit rearrangement $P_0(i)$.

TABLE 3

| i | $P_0(i)$ |
|---|---|
| 0 | 0 |
| 1 | 15 |
| 2 | 7 |
| 3 | 9 |
| 4 | 13 |
| 5 | 12 |
| 6 | 5 |
| 7 | 2 |
| 8 | 16 |
| 9 | 14 |
| 10 | 6 |
| 11 | 11 |
| 12 | 10 |
| 13 | 4 |
| 14 | 8 |
| 15 | 3 |
| 16 | 1 |

In view of the fact that the number of bits carried by a single OFDM symbol in the 2K mode is 17, the first-step rearrangement rule $P_1(i)$ rearranges, in a pseudo random manner, four 17-bit sub blocks $s_0$-$s_{16}$, $s_{17}$-$s_{33}$, $s_{34}$-$s_{50}$ and $s_{51}$-$s_{67}$ divided from a TPS block $s_0$-$s_{67}$. The same rule for rearrangement is applied to each sub-block. According to this rule, in the 2K mode or 4K mode, the rearrangement of the bits is not performed across different OFDM symbols included in the four or two OFDM symbols for carrying the bits of the TPS block $s_0$-$s_{67}$.

The second step rearrangement rule $P_2(i)$ is not common among all the transmission modes. In the case of the 2K mode, the rule $P_2(i)$ is given by [Math. 9] below. In the case of the 4K mode, the rule $P_2(i)$ is given by [Math. 10] below. In the case of the 8K mode, the 16K mode, and the 32K mode, the rule $P_2(i)$ is given by [Math. 11] below.

$$P_2(i) = i \qquad \text{[Math. 9]}$$

$$P_2(i) = \begin{cases} (i+17 \times (i \bmod 17)) \bmod 34, & 0 \le i \le 33 \\ ((i+17 \times (i \bmod 17)) \bmod 34) + 34, & 34 \le i \le 67 \end{cases} \qquad \text{[Math. 10]}$$

$$P_2(i) = (i+17 \times (i \bmod 17)) \bmod 68 \qquad \text{[Math. 11]}$$

In the [Math. 9], the [Math. 10] and the [Math. 11], i is a value obtained as a result of the first-step rearrangement represented as [Math. 8] above.

In the case of the 2K mode, the first-step rearrangement is performed for rearranging the bits of the TPS sub blocks $s'_0$-$s'_{16}$, $s'_{17}$-$s'_{33}$, $s'_{34}$-$s'_{50}$ and $s'_{51}$-$s'_{67}$ included in the TPS block $s'_0$-$s'_{67}$, within the whole of each TPS sub block, in a pseudo random manner. Thus the rearrangement rule $P_2(i)$ for the 2K mode shown in the [Math. 9] does not newly rearrange the bits $s'_0$-$s'_{67}$ of the TPS block.

In the case of the 4K mode, the first-step rearrangement is not performed for rearranging the bits of the TPS sub blocks $s'_0$-$s'_{33}$ and $s'_{34}$-$s'_{67}$ included in the TPS block $s'_0$-$s'_{67}$, within the whole of each TPS sub block, in a pseudo random manner. The rearrangement rule $P_2(i)$ for the 4K mode shown in the [Math. 10] is performed for rearranging the bits of the TPS sub blocks $s'_0$-$s'_{33}$ and $s'_{34}$-$s'_{67}$ included in the TPS block $s'_0$-$s'_{67}$, within the whole of each TPS sub block, in a pseudo random manner. However, the rearrangement is not performed between the TPS sub block $s'_0$-$s'_{33}$ and the TPS sub block $s'_{34}$-$s'_{67}$.

In the case of the 8K mode, the 16K mode and the 32K mode, the first-step rearrangement is not performed for rearranging the bits of the TPS block $s'_0$-$s'_{67}$ within the whole TPS block, in a pseudo random manner. The rearrangement rule $P_2(i)$ for the 8K mode, the 16K mode and the 32K mode shown in the [Math. 11] is performed for rearranging the bits of the TPS block $s'_0$-$s'_{67}$ within the whole TPS block, in a pseudo random manner.

Note that the rearrangement rule P(i) is for rearranging the bits of TPS sub blocks or a TPS block within OFDM symbol, and that the same rule is applied to each OFDM symbol.

<Pilot Generation Unit 111>

The pilot generation unit 111 generates an SP signal and a CP signal according to PRBS sequence data $w_k$ that corresponds to the carrier number k of the carrier that carries the signals, and outputs the generated SP signal and the CP signal to the mapping unit 112.

<Mapping Unit 112>

The mapping unit 112 generates a modulation symbol according to the transmission data received from the inner interleaver 109, and outputs the generated modulation symbol to the frame adaptation unit 113. The modulation symbol based on the transmission data is mapped on a complex number that belongs to either one of QPSK (Quadrature Phase Shift Keying), 16 QPSK (Quadrature Amplitude Modulation), 64 QAM, non-uniform 16 QPSK and 64 QAM constellations.

Further, the mapping unit 112 generates a modulation symbol according to an SP signal and a CP signal received from the pilot generation unit 111, and outputs the generated modulation symbol to the frame adaptation unit 113. The modulation symbol based on the SP signal and the CP signal is mapped on a complex number that belongs to BPSK (Binary Phase Shift Keying) constellation and is at a boosted power level, the modulation symbol based on the SP signal and the CP signal is given by the following [Math. 12].

$$\text{Re}\{c_{m,n,k}\} = \frac{4}{3} \times 2\left(\frac{1}{2} - w_k\right)$$ [Math. 12]

$$\text{Im}\{c_{m,n,k}\} = 0$$

In the [Math. 12], m represents the frame number, n represents the symbol number and k represents the carrier number. $C_{m,n,k}$ represents the complex number (i.e. modulation symbol) allocated to a cell having the frame number m, the symbol number n and the carrier number k, and $w_k$ represents the PRBS sequence data corresponding to the carrier number k. Re{ } is an operator representing a real number part, and Im{ } is an operator representing an imaginary number.

The mapping unit 112 further generates a modulation symbol by mapping on a complex number each of the bits constituting the TPS block $s''_0$-$s''_{67}$ received from the TPS signal generation unit 110, according to the DBPSK. The mapping unit 112 outputs the generated modulation symbol to the frame adaptation unit 113.

The following explains the details of the mapping of a TPS block $s''_0$-$s''_{67}$ performed by the mapping unit 112.

The mapping unit 112 determines the bits $s''_{Q(j,n)}$ constituting the TPS block $s''_0$-$s''_{67}$ carried by a cell having a symbol number n and a carrier number $k_{TPS}(J)$ included in the frame. For this purpose, in the case of the 2K mode, the mapping unit 112 follows the [Math. 13] below. In the case of the 4K mode, the mapping unit 112 follows the [Math. 14] below. In the case of the 8K mode, the 16K mode and the 32K mode, the mapping unit 112 follows the [Math. 15] below.

$$Q(j,n) = j + 17 \times (n \bmod 4)$$ [Math. 13]

$$Q(j,n) = j + 34 \times (n \bmod 2)$$ [Math. 14]

$$Q(j,n) = j \bmod 68$$ [Math. 15]

In the [Math. 13], the [Math. 14] and the [Math. 15], n represents the symbol number within the frame, j represents the TPS carrier index of a TPS carrier, and Q(j,n) represents the function for allocating binary data $s''_{Q(j,n)}$ constituting a TPS block to cells constituting the frame.

In the 2K mode, a single TPS block $s''_0$-$s''_{67}$ is carried by four continuous OFDM symbols, according to the [Math. 13]. A TPS sub block $s''_0$-$s''_{16}$ is carried by OFDM symbols having symbol numbers 0, 4, 8, etc. A TPS sub block $s''_{17}$-$s''_{33}$ is carried by OFDM symbols having symbol numbers 1, 5, 9, etc. A TPS sub block $s''_{34}$-$s''_{50}$ is carried by OFDM symbols having symbol numbers 2, 6, 10, etc. A TPS sub block $s''_{51}$-$s''_{67}$ is carried by OFDM symbols having symbol numbers 3, 7, 11, etc.

In the 4K mode, a single TPS block $s''_0$-$s''_{67}$ is carried by two continuous OFDM symbols, according to the [Math. 14]. A TPS sub block $s''_0$-$s''_{33}$ is carried by OFDM symbols having symbol numbers 0, 2, 4, etc. A TPS sub block $s''_{34}$-$s''_{67}$ is carried by OFDM symbols having symbol numbers 1, 3, 5, etc.

In the 8K mode, a single TPS block $s''_0$-$s''_{67}$ is carried by a single OFDM symbol, according to the [Math. 15]. A single OFDM symbol carries a single TPS block $s''_0$-$s''_{67}$. In the 16K mode, a single TPS block $s''_0$-$s''_{67}$ is carried by a single OFDM symbol, according to the [Math. 15]. A single OFDM symbol carries Two TPS blocks $s''_0$-$s''_{67}$. In the 32K mode, a single TPS block $s''_0$-$s''_{67}$ is carried by a single OFDM symbol, according to the [Math. 15]. A single OFDM symbol carries four TPS blocks $s''_0$-$s''_{67}$.

Except for the case of the initialization bit $s_0$, the mapping unit 112 maps the binary data $s''_{Q(j,n)}$ constituting a TPS block $s''_0$-$s''_{67}$ to be carried by a cell having a symbol number n and a carrier number $k_{TPS}(j)$, on a complex number based on the DBPSK as the [Math. 16] below shows.

$$\begin{cases} \text{if } s''_{Q(j,n)} = 0, & \text{then} \operatorname{Re}\{c_{m,n,k_{TPS}(j)}\} = \operatorname{Re}\{c_{m,n-1,k_{TPS}(j)}\}; \\ & \operatorname{Im}\{c_{m,n,k_{TPS}(j)}\} = 0 \\ \text{if } s''_{Q(j,n)} = 1, & \text{then} \operatorname{Re}\{c_{m,n,k_{TPS}(j)}\} = -\operatorname{Re}\{c_{m,n-1,k_{TPS}(j)}\}; \\ & \operatorname{Im}\{c_{m,n,k_{TPS}(j)}\} = 0 \end{cases}$$ [Math. 16]

In the [Math. 16], m represents the frame number, n represents the symbol number, j represents the TPS carrier index of a TPS carrier, and $k_{TPS}(j)$ represents the carrier number. $C_{m,n,kTPS(j)}$ (Here, the $k_{TPS}(j)$ is represented as kTPS(j)) represents the complex number (i.e. modulation symbol) allocated to a cell having a frame number m, a symbol number n and a carrier number $k_{TPS}(j)$. Re{ } is an operator representing a real number part, and Im{ } is an operator representing an imaginary number.

In the case of the initialization bit $s_0$, the mapping unit 112 maps the binary data $s''_{Q(j,n)}$ constituting a TPS block $s''_0$-$s''_{67}$ to be carried by a cell having a symbol number n and a carrier number $k_{TPS}(j)$, on a complex number based on the DBPSK as the [Math. 17] below shows.

$$\operatorname{Re}\{c_{m,n,k_{TPS}(j)}\} = 2\left(\frac{1}{2} - w_{k_{TPS}(j)}\right)$$ [Math. 17]

$$\operatorname{Im}\{c_{m,n,k_{TPS}(j)}\} = 0$$

In the [Math. 17], m represents the frame number, n represents the symbol number, j represents the TPS carrier index of a TPS carrier, and $k_{TPS}(j)$ represents the carrier number. $C_{m,n,kTPS(j)}$ (Here, the $k_{TPS}(j)$ is represented as kTPS(j)) represents the complex number (i.e. modulation symbol) allocated to a cell having a frame number m, a symbol number n and a carrier number $k_{TPS}(j)$. $w_{kTPS(j)}$. (Here, $k_{TPS}(j)$ is represented as kTPS(j)) uses a PRBS sequence $w_k$ for modulating a SP signal and a CP signal, where $k=k_{TPS}(j)$.

<Frame Adaptation Unit 113>

The frame adaptation unit 113 allocates modulation symbols received from the mapping unit 112 to the cells constituting the frame, to construct a frame for transmitting them, and outputs a frame signal pertaining to the constructed frame to the OFDM modulation unit 114.

<OFDM Modulation Unit 114>

The OFDM modulation unit 114 modulates each carrier included in the frame signal received from the frame adaptation unit 113 according to the modulation symbol (i.e. complex number) allocated to the cell corresponding to the carrier, and multiplexes the modulated carriers. The OFDM modulation unit 114 thereby generates a modulation signal having a useful symbol duration $T_U$. Here, note that the OFDM modulation unit 114 performs the modulation and the multiplexing by transforming the modulation symbol from the frequency domain representation to the time domain representation by using the inverse Fourier transform. For the modulation and the multiplexing, the OFDM modulation unit 114 may use the inverse fast Fourier transform.

<Guard Interval Insertion Unit 115>

The guard interval insertion unit 115 generates a signal having the duration Δ of the guard interval (hereinafter called "guard interval signal"), which is to be inserted into the guard interval part based on the modulation signal of the useful symbol duration $T_U$ received from the OFDM modulation unit 114. Then, the guard interval insertion unit 115 outputs the modulation signal to which the guard interval signal has been added (hereinafter called "OFDM signal") to the D/A conversion unit 116.

The signal to be inserted into the guard interval part is a signal corresponding to the guard interval part where the modulation signal having the useful symbol duration $T_U$ is cyclically and continuously repeated. For example, the signal to be inserted into the guard interval part is an end portion corresponding to the duration Δ of the guard interval of the modulation signal generated by the OFDM modulation unit 114 and having the useful symbol duration T.

<D/A Conversion Unit 116>

The D/A conversion unit 116 converts the OFDM signal received from the guard interval insertion unit 115 from a digital signal to an analog signal, and outputs the analog signal resultant from the conversion to the front-end unit 117.

<Front-End Unit 117>

The front-end unit 117 converts the frequency of the OFDM signal received from the D/A conversion unit 116, which has been converted into an analogue signal, to be in the transmission frequency bandwidth, and amplifies the OFDM signal in the transmission frequency bandwidth obtained through the frequency conversion. The amplified OFDM signal in the transmission frequency bandwidth is transmitted from the antenna 118.

The OFDM signal transmitted from the antenna 118 is given by [Math. 18] below.

$$s(t) = \operatorname{Re}\left\{e^{j2\pi f_c t}\sum_{m=0}^{\infty}\sum_{n=0}^{67}\sum_{k=K_{min}}^{K_{max}} c_{m,n,k} \times \Psi_{m,n,k}(t)\right\}$$ [Math. 18]

where $$\Psi_{m,n,k}(t) = \begin{cases} e^{j2\pi\frac{k'}{T_U}(t-\Delta-nT_s-68mT_s)} & (n+68m)T_s \le t \le (n+68m+1)T_s \\ 0 & \text{else} \end{cases}$$

In the [Math. 18], t represents the time, and s (t) represents then OFDM signal transmitted from the antenna 118. k represents the carrier number, n represents the symbol number, and m represents the frame number. The value of $K_{max}$ depends on the transmission mode, and $K_{min}$ and $K_{max}$ are values described above for example. $T_S$ is an OFDM symbol duration, and $T_U$ is the inverse of the carrier spacing (i.e. useful symbol duration), and Δ is the duration of the guard interval. $f_c$ is the central frequency of the RF (Radio Frequency). K' is the relative carrier index to the central frequency, where $k'=k-(K_{min}+K_{max})/2$. $C_{m,n,k}$ represents the complex number (i.e. modulation symbol) allocated to a cell having the frame number m, the symbol number n and the carrier number k.

<<Operations of Transmitter>>

The following explains the operations of the transmitter whose structure has been explained above, with reference to FIG. 2 and FIG. 3.

The first series of transport stream (i.e. transmission data) input to the transmitter 100 is sequentially subject to prescribed processing performed by the energy dispersal unit 101, the outer coding unit 102, the outer interleaver 103 and the inner coding unit 104. In parallel, the second series of transport stream (i.e. transmission data) input to the transmitter 100 is sequentially subject to prescribed processing procedures performed by the energy dispersal unit 105, the outer coding unit 106, the outer interleaver 107 and the inner coding unit 108. The transmission data output from the inner coding unit 104 and the transmission data output from the inner coding unit 108 are interleaved by the inner interleaver 109, and the interleaved transmission data is provided to the mapping unit 112.

In the TPS signal generation unit 110, the TPS block generation unit 151 generates the TPS block $s_0$-$s_{67}$ one by one. The rotation unit 152 rearranges the bits of the TPS block $s_0$-$s_{67}$, generated by the TPS block generation unit 151 one by one, according to the prescribed rules explained above. Subsequently, the permutation unit 153 rearranges the bits of the TPS block $s'_0$-$s'_{67}$, obtained through the rearrangement by the rotation unit 152, according to the prescribed rules described above. The rearranged TPS block $s''_0$-$s''_{67}$ is provided to the mapping unit 112.

The pilot generation unit 111 generates the SP and CP signals. The generated SP and CP signals are provided to the mapping unit 112.

The mapping unit 112 performs the mapping processing on the transmission data provided by the inner interleaver 109, the binary data constituting the TPS block $s''_0$-$s''_{67}$ provided by the TPS signal generation unit 110, and the SP and CP signals provided by the pilot generation unit 111. The modulation symbols generated through the mapping processing are provided to the frame adaptation unit 113.

The frame adaptation unit 113 allocates the modulation symbols provided by the mapping unit 112, respectively to the cells constituting the frame. The OFDM modulation unit 114 generates the modulation signal having the useful symbol duration $T_U$ by modulating the carriers according to the modulation symbols allocated to the cells respectively corresponding to the carriers, and multiplexing the modulated carriers. The guard interval insertion unit 115 adds the signal having the guard interval duration $\Delta$ (i.e. guard interval signal) to the modulation signal having the useful symbol duration $T_U$, which has been generated by the OFDM modulation unit 114.

The modulation signal (OFDM signal) to which the guard interval signal is added, output from the guard interval insertion unit 115, is subject to the prescribed processing performed by the D/A conversion unit 116 and the front-end unit 117. The OFDM signal on which the prescribed processing has been performed is transmitted by the front-end unit 117 via the antenna 118.

<<Structure of Receiver>>

Figure 4:
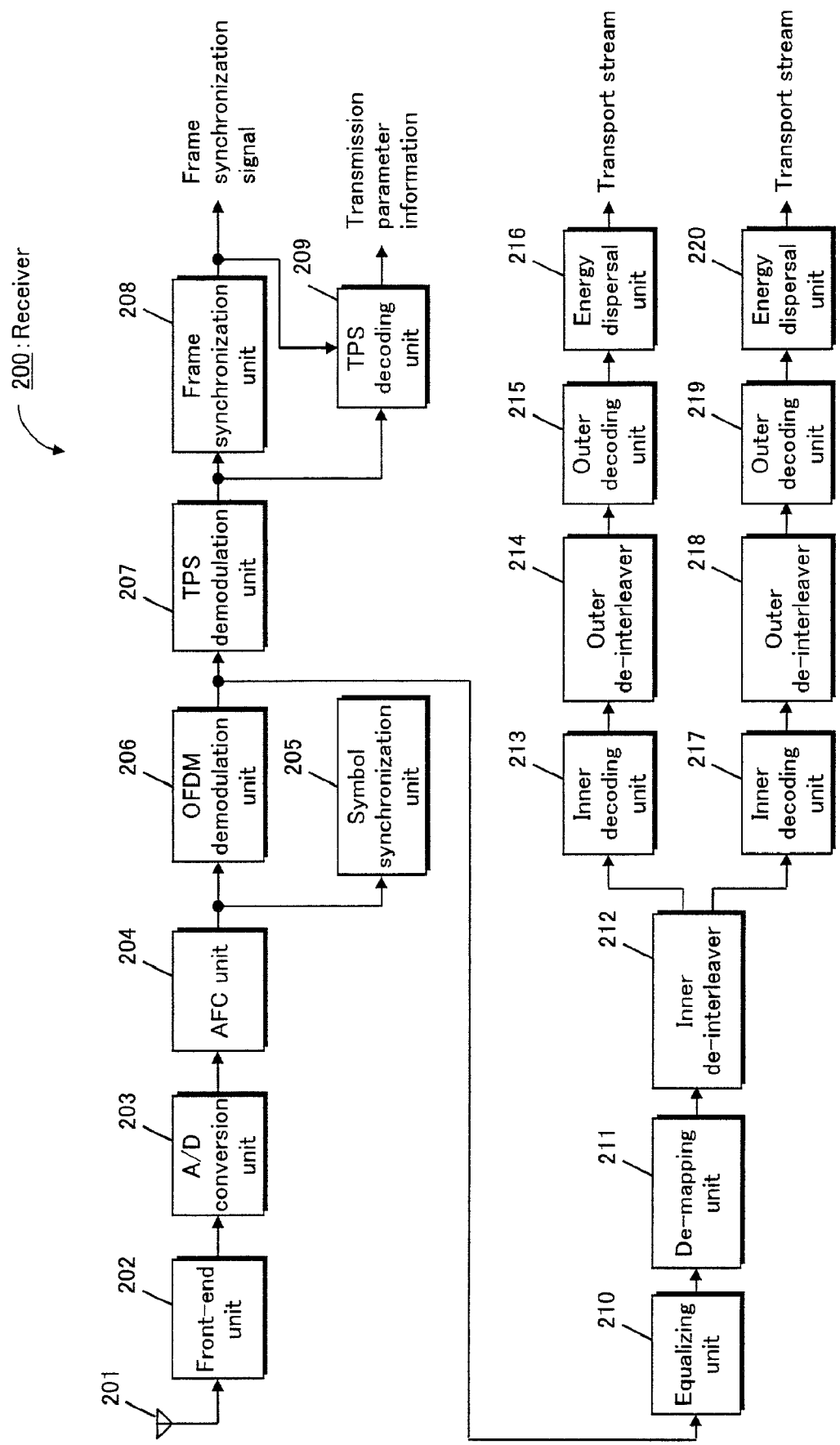
FIG. 4 shows the structure of the receiver pertaining to an embodiment of the present invention.

The following explains the structure of the receiver pertaining to an embodiment of the present invention, with reference to FIG. 4. FIG. 4 shows the structure of the receiver pertaining to the present embodiment.

A receiver 200 includes an antenna 201, a front-end unit 202, an A/D conversion unit 203, an AFC unit 204, a symbol synchronization unit 205, an OFDM demodulation unit 206, a TPS demodulation unit 207, a frame synchronization unit 208, a TPS decoding unit 209, an equalizing unit 210, a de-mapping unit 211, an inner de-interleaver 212, an inner decoding unit 213, an outer de-interleaver 214, an outer decoding unit 215, an energy dispersal unit 216, an inner decoding unit 217, an outer de-interleaver 218, an outer decoding unit 219, and an energy dispersal unit 220.

<Front-End Unit 202>

The OFDM signal transmitted from the transmitter 100 is received by the antenna 201, and input into the front-end unit 202. The front-end unit 202 converts the frequency of the OFDM signal in the transmission frequency bandwidth input from the antenna 201, to be in the band width. The front-end unit 202 outputs the OFDM signal in the band width to the A/D conversion unit 203.

<A/D Conversion Unit 203>

The A/D conversion unit 203 converts the OFDM signal received from the front-end unit 202 from an analogue signal to a digital signal by sampling the OFDM signal at a prescribed sampling frequency. The A/D conversion unit 203 outputs the digitized OFDM signal to the AFC unit 204.

<AFC Unit 204>

The AFC unit 204 is a block for performing auto frequency control. The AFC unit 204 corrects the frequency drift of the OFDM signal received from the A/D conversion unit 203, and outputs the OFDM signal resultant from the correction of the frequency drift to the symbol synchronization unit 205 and the OFDM demodulation unit 206.

<Symbol Synchronization Unit 205>

The symbol synchronization unit 205 detects the cycle of the OFDM symbols constituting the OFDM signal received from the AFC unit 204, and establishes the symbol synchronization in the entire receiver 200.

<OFDM Demodulation Unit 206>

The OFDM demodulation unit 206 detects, from each of the OFDM symbols, the modulation signal carried by the plurality of carriers included in the OFDM signal received from the AFC unit 204, and outputs the detection symbol represented with a complex number to the TPS demodulation unit 207 and the equalizing unit 210. Note that the OFDM demodulation unit 206 performs the detection by clipping a part having the useful symbol duration $T_U$ from the OFDM signal based on the result of the establishment of the symbol synchronization by the synchronization unit 205, and converting the clipped signal having the useful symbol duration $T_U$ from the time domain representation to the frequency domain representation by using the Fourier transform. For the detection, the OFDM demodulation unit 206 may use the fast Fourier transform.

<TPS Demodulation Unit 207>

As FIG. 5 shows, the TPS demodulation unit 207 includes a DBPSK demodulation unit 231 and an inverse permutation unit 232.

[DBPSK Demodulation Unit 231]

The DBPSK demodulation unit 231 extracts from the detection symbols received from the OFDM demodulation unit 206, detection symbols carried by the TPS carrier (i.e. the carrier having the carrier number for carrying the TPS determined according to the transmission mode). Then, the DBPSK demodulation unit 231 performs the DBPSK demodulation in the symbol time direction on the detection symbols extracted from each TPS carrier. The DBPSK demodulation unit 231 outputs the binary data resultant from the DBPSK demodulation to the inverse permutation unit 232.

[Inverse Permutation Unit 232]

The inverse permutation unit 232 rearranges the bits received from the DBPSK demodulation unit 231 according to the inverse of the rearrangement rule that is used by the permutation unit 153 of the transmitter 100 and corresponds to the transmission mode. The inverse permutation unit 232 outputs, in units of the TPS blocks, the binary data resultant from the rearrangement to the frame synchronization unit 208, and a combining unit 272 included in the TPS decoding unit 209. The combining unit 272 will be described later. Since the same rearrangement rule used by the permutation unit 153 is applied to all the OFDM symbols, the inverse permutation unit 232 can perform the rearrangement of the binary data without being notified of the symbol numbers of the OFDM symbols as the targets of the rearrangement of the binary data.

Note that the TPS block output from the inverse permutation unit 232 is the TPS block whose bits have been cyclically shifted by the rotation unit 142 of the transmitter 100.

Also, in the 2K mode for example, the inverse permutation unit 232 sequentially outputs the TPS block pertaining to the symbol numbers 3-6, the TPS block pertaining to the symbol numbers 4-7, the TPS block pertaining to the symbol numbers 5-8, . . . and so on.

<Frame Synchronization Unit 208>

As FIG. 5 shows, the frame synchronization unit 208 includes a synchronization word detection unit 251 and a synchronization protection unit 252.

[Synchronization Word Detection Unit 251]

The synchronization word detection unit 251 performs detection of the synchronization word from the TPS block input from the inverse permutation unit 232. Then the synchronization word detection unit 251 outputs to the synchronization protection unit 252, positional information showing the position of the synchronization word within the TPS block and reflected code information showing which one of the two types of the reflected codes the detected synchronization word is.

[Synchronization Protection Unit 252]

The synchronization protection unit 252 receives the positional information and the reflected code information from the synchronization word detection unit 251. The synchronization protection unit 252 performs frame synchronization reproduction based on the position of the detected synchronization word within the TPS block, indicated by the positional information, and the type of the reflected code indicated by the reflected code information. The synchronization protection unit 252 outputs the frame synchronization signal to an inverse rotation unit 273 included in the TPS decoding unit 209, which will be described later, and prescribed units included in the receiver 200.

The following describes in detail the processing performed by the synchronization protection unit 252.

As explained above, the number n' of the bit of the TPS block $s_0$-$s_{67}$ to be cyclically shifted by the rotation unit 152 of the transmitter 100 is determined based on the symbol number within the frame. The synchronization word is the two types of the reflected codes.

The synchronization protection unit 252 determines the number n' of the bit of the TPS block that has been cyclically shifted, based on the position of the detected synchronization word included in the TPS block indicated by the positional information (i.e. the TPS block output from the inverse permutation unit 232). Next, the synchronization protection unit 252 specifies the symbol position of the TPS block within the frame, based on the determined bit number n'.

Further, the synchronization protection unit 252 observes the change of the position of the detected synchronization word within the TPS block, and the type of the reflected code pertaining to the detected synchronization word, performs the synchronization protection, and outputs the frame synchronization signal to the inverse rotation unit 273 included in the TPS decoding unit 209, which will be described later, and prescribed units included in the receiver 200. To enable the inverse rotation unit 273 to perform the inverse rotation on the TPS block, the synchronization protection unit 252 outputs to the inverse rotation unit 252 the number n' of the bit of the TPS block that has been cyclically shifted.

<TPS Decoding Unit 209>

As FIG. 5 shows, the TPS decoding unit 209 includes a memory 271, a combining unit 272, an inverse rotation unit 273 and a BCH decoding unit 274.

[Memory 271]

The memory 271 stores the midterm results of the combining performed by the combining unit 272.

[Combining Unit 272]

While storing the midterm results of the combining into the memory 271, the combining unit 272 combines the same bits in each TPS block generated by the TPS block generation unit 151, using the TPS blocks from the inverse permutation unit 232, which include the same synchronization word. The combining unit 272 outputs the TPS block resultant from the combining to the inverse rotation unit 273. Note that it is possible to distinguish the TPS blocks that include the same synchronization word from the TPS blocks output by the inverse permutation unit 232, based on the fact that the synchronization word is reflected codes.

Note that the TPS block input into the combining unit 272 is the TPS block that has been subject to the rotation processing by the rotation unit 152 of the transmitter 100, and thus the number n' of the bits of the TPS block to be shifted regularly changes. In other words, the positional relationship among the same bits of the TPS block generated by the TPS block generation unit 151 is known to the receiver 200. The combining unit 272 is therefore capable of performing the calculation for the combining of the TPS block in advance of the establishment of the frame synchronization by the frame synchronization unit 208.

[Inverse Rotation Unit 273]

The inverse rotation unit 273 rearranges the bits of the TPS block from the combining unit 272, which has been subject to the combining processing, according to the frame synchronization signal received from the synchronization protection unit 252, using the bit number n' received from the synchronization protection unit 252. For the rearrangement, the inverse rotation unit 273 follows the rearrangement rule that is the inverse of the rearrangement rule used by the rotation unit 152 of the transmitter 100 according to the transmission mode. The inverse rotation unit 273 outputs the TPS block resultant from the rearrangement, to the BCH decoding unit 274.

[BCH Decoding Unit 274]

The BCH decoding unit 274 performs decoding (i.e. error correction) according to the BCH code on the TPS block received from the inverse rotation unit 273, and configures the settings of each unit of the receiver 200 based on the transmission parameter information obtained through the decoding (i.e. error correction). Note that the transmission parameter includes the Constellation (the modulation method for the data transmission carriers), the Hierarchy information, the Code rates for the channel coding, the guard interval duration, the transmission mode and the cell ID. Each of the components of the receiver that use the guard interval period, the transmission mode and so on usually use other known methods to specify the guard interval length and the transmission mode, instead of using the transmission parameter information.

<Equalizing Unit 210>

The equalizing unit 210 extracts from the detection symbols received from the OFDM demodulation unit 206, detection symbols corresponding to the carriers that carry either the SP signal or the CP signal, and estimates the channel characteristics, based on the extracted symbols. After that, the equalizing unit 210 equalizes the detection symbols corresponding to the carriers that carry the transmission data, based on the estimated channel characteristics.

<De-Mapping Unit 211>

The de-mapping unit 211 de-maps, based on the Constellation indicated by the transmission parameter information, the detection symbols received from the equalizing unit 210, on which the equalizing processing has been performed. The de-mapping unit 211 outputs the demodulated data resultant from the de-mapping to the inner de-interleaver 212.

[Inner De-Interleaver 212]

The inner de-interleaver 212 rearranges the demodulated data received from the de-mapping unit 211, in the inverse order of the interleaving processing performed by the inner interleaver 109 included in the transmitter 100. The inner de-interleaver 212 separates the rearranged demodulated data into two hierarchies according to the Hierarchy information included in the transmission parameter information, and outputs one of them to the inner decoding unit 213 and the other to the inner decoding unit 217.

<Inner Decoding Unit 213>

The inner decoding unit 213 performs decoding (i.e. error correction) on the received one of the two hierarchies of the demodulated data output from the inner de-interleaver 212, according to the convolutional code, which is an inner code. The inner decoding unit 213 outputs the decoded data resultant from the decoding (i.e. error correction) to the outer de-interleaver 214. Note that the inner decoding unit 213 performs the decoding processing (i.e. error correction processing) by using the Viterbi algorithm, for example.

<Outer De-Interleaver 214>

The outer de-interleaver 214 rearranges the decoded data received from the inner decoding unit 213, in the inverse order of the per-byte convolutional interleaving processing performed by the outer interleaver 103 of the transmitter 100. The outer de-interleaver 214 outputs the rearranged decoded data to the outer decoding unit 215.

<Outer Decoding Unit 215>

The outer decoding unit 215 performs decoding (i.e. error correction) on the decoded data received from the outer de-interleaver 214, according to the RS code, which is an outer code. The outer decoding unit 215 outputs the decoded data resultant from the decoding (i.e. error correction) to the energy dispersal unit 216.

<Energy Dispersal Unit 216>

The energy dispersal unit 216 cancels out the energy dispersal on the decoded data received from the outer decoding unit 215, which has been performed by the energy dispersal unit 101 of the transmitter 100. The energy dispersal unit 216 outputs the decoded data resultant from the canceling out of the energy dispersal, as the first series of transport stream.

<Inner Decoding Unit 217>

The inner decoding unit 217 performs decoding (i.e. error correction) on the other one of the two hierarchies of the demodulated data output from the inner de-interleaver 212, according to the convolutional code, which is an inner code. The inner decoding unit 217 outputs the decoded data resultant from the decoding (i.e. error correction) to the outer de-interleaver 218. Note that the inner decoding unit 217 performs the decoding processing (i.e. error correction processing) by using the Viterbi algorithm, for example.

<Outer De-Interleaves 218>

The outer de-interleaver 218 rearranges the decoded data received from the inner decoding unit 217, in the inverse order of the per-byte convolutional interleaving processing performed by the outer interleaver 107 of the transmitter 100. The outer de-interleaver 218 outputs the rearranged decoded data to the outer decoding unit 219.

<Outer Decoding Unit 219>

The outer decoding unit 219 performs decoding (i.e. error correction) on the decoded data received from the outer de-interleaver 218, according to the RS code, which is an outer code. The outer decoding unit 219 outputs the decoded data resultant from the decoding (i.e. error correction) to the energy dispersal unit 220.

<Energy Dispersal Unit 220>

The energy dispersal unit 220 cancels out the energy dispersal on the decoded data received from the outer decoding unit 219, which has been performed by the energy dispersal unit 105 of the transmitter 100. The energy dispersal unit 220 outputs the decoded data resultant from the canceling out of the energy dispersal, as the second series of transport stream.

<<Operations of Receiver>>

The following explains the operations of the receiver whose structure has been explained above, with reference to FIG. 4 and FIG. 5.

The OFDM signal transmitted from the transmitter 100 is received by the antenna 201. The OFDM signal received by the antenna 201 is sequentially subjected to the prescribed processing by the front-end unit 202, the A/D conversion unit 203 and the AFC unit 204, and is then provided to the symbol synchronization unit 205 and the OFDM demodulation unit 206.

The symbol synchronization unit 205 establishes the symbol synchronization in the entire receiver 200.

The OFDM demodulation unit 206 detects, from each of the OFDM symbols, the modulation signal carried by the plurality of carriers included in the OFDM signal received from the AFC unit 204, and outputs the detection symbol represented with a complex number to the TPS demodulation unit 207 and the equalizing unit 210.

In the TPS demodulation unit 207, the DBPSK demodulation unit 231 extracts from the detection symbols received from the OFDM demodulation unit 206, detection symbols carried by the TPS carrier, and performs the DBPSK demodulation in the symbol time direction on the detection symbols extracted from each TPS carrier. The inverse permutation unit 232 rearranges the bits received from the DBPSK demodulation unit 231 according to the inverse of the rearrangement rule that is used by the permutation unit 153 of the transmitter 100 and corresponds to the transmission mode. The inverse permutation unit 232 outputs, in units of the TPS blocks, the binary data resultant from the rearrangement to the frame synchronization unit 208 and the TPS decoding unit 209.

In the frame synchronization unit 208, the synchronization word detection unit 251 performs detection of the synchronization word from the TPS block input from the inverse permutation unit 232. The synchronization protection unit 252 performs the frame synchronization reproduction based on the change of the results of the synchronization word detection performed by the synchronization word detection unit 251 (i.e. the position of the detected synchronization word within the TPS block, indicated by the positional information, and the type of the reflected code indicated by the reflected code information).

In the TPS decoding unit 209, the combining unit 272 combines the same bits in each TPS block, using the TPS blocks from the inverse permutation unit 232, which include the same synchronization word, while storing the midterm results of the combining into the memory 271. The inverse rotation unit 273 rearranges the bits of the TPS block from the combining unit 272, which has been subject to the combining processing, according to the frame synchronization signal received from the synchronization protection unit 252, using the bit number n' received from the synchronization protection unit 252. For the rearrangement, the inverse rotation unit 273 follows the rearrangement rule that is the inverse of the rearrangement rule used by the rotation unit 152 of the transmitter 100 according to the transmission mode. The inverse rotation unit 273 outputs the TPS block resultant from the rearrangement, to the BCH decoding unit 274. The BCH decoding unit 274 performs decoding (i.e. error correction) according to the BCH code on the TPS block received from the inverse rotation unit 273, and configures the settings of each unit of the receiver 200 based on the transmission parameter information obtained through the decoding (i.e. error correction).

The equalizing unit 210 extracts from the detection symbols received from the OFDM demodulation unit 206, detection symbols corresponding to the carriers that carry either the SP signal or the CP signal, and estimates the channel characteristics, based on the extracted symbols. After that, the equalizing unit 210 equalizes the detection symbols corresponding to the carriers that carry the transmission data, based on the estimated channel characteristics.

The detection symbols equalized by the equalizing unit 210 are subject to the de-mapping by the de-mapping unit 211. The demodulated data resultant from the de-mapping is subject to the interleaving processing by the inner de-interleaver 212. After that, the one of the hierarchies of the demodulated data is provided to the inner decoding unit 213, and the other is provided to the inner decoding unit 217.

One of the hierarchies of the demodulated data is subject to the decoding by the inner decoding unit 213, and the decoded data is subject to the prescribed processing by the outer de-interleaver 214, the outer decoding unit 215 and the energy dispersal unit 216. After the processing, the decoded data is output from the energy dispersal unit 216.

The other one of the hierarchies of the demodulated data is subject to the decoding by the inner decoding unit 217, and the decoded data is subject to the prescribed processing by the outer de-interleaver 218, the outer decoding unit 219 and the energy dispersal unit 220. After the processing, the decoded data is output from the energy dispersal unit 220.

According to the embodiment above, the transmitter 100 transmits a plurality of bits of the TPS block $s_0$-$s_{67}$, which include the synchronization word and the transmission parameter, by using a single OFDM symbol. The transmitter 100 repeatedly transmits the bits of the TPS block $s_0$-$s_{67}$ by using a carrier group consisted of a plurality of TPS carriers. During the repeated transmissions of the TPS block $s_0$-$s_{67}$, the transmitter 100 switches the TPS carries for carrying the bits of the TPS block $s_0$-$s_{67}$, according to the prescribed rule.

In this way, since the transmitter 100 transmits a plurality of bits of the TPS block $s_0$-$s_{67}$ per single OFDM symbol, it is possible to reduce the number of OFDM symbols required for transmitting the single TPS block $s_0$-$s_{67}$, in comparison with the case of transmitting only one bit of the TPS block $s_0$-$s_{67}$ per single OFDM symbol. As a result, the receiver 200 can acquire the transmission parameter and so on in a short period.

Each bit of the TPS block $s_0$-$s_{67}$ is repeatedly and dispersively transmitted by a plurality of carriers and a plurality of OFDM symbols. This achieves diversity effects with respect to both the frequency direction and the time direction. As a result, it is possible to improve the transmission quality of the TPS block $s_0$-$s_{67}$ including the transmission parameter information, in terms of the robustness against the frequency selective fading of the channels, the time-dependent change of the channels, and the impulse noises.

By using the rotation unit 152, the transmitter 100 sequentially changes the correspondence between the bits of the TPS block $s_0$-$s_{67}$ and the TPS carriers, according to the prescribed rule. As a result, it is possible to achieve the frequency diversity effects and the time diversity effects.

Also, by using the permutation unit 153, the transmitter 100 pseudo-randomly rearranges the bits of the TPS block $s'_0$-$s'_{67}$ resultant from the rearrangement by the rotation unit 152. As a result, it is possible to further complicate the pre-scribed rule for sequentially changes the correspondence between the bits of the TPS block $s_0$-$s_{67}$ and the TPS carriers. As a result, it is possible to increase the diversity effects.

Moreover, the combining unit 272 may increase the number of the TPS blocks to combine in the case the channel condition is poor, and may decrease the number of the TPS blocks to combine in the case the channel condition is poor, so that it can control the tradeoff between shortening of the time required for the acquisition of the transmission parameter information and improvement of the transmission quality.

<Supplemental Explanation>

The present invention is not limited to the embodiments explained above. For example, the present invention may be modified in the following manners:

(1) In the embodiments above, the DVB-T standard is explained as an example. However, the present invention is not limited to this. The mechanism of the transmission of the TPS block as explained in the embodiment above may be applied to ISDB-T (Integrated Services Digital Broadcasting Terrestrial) standard. If this is the case, the TPS will be replaced with TMCC (Transmission and Multiplexing Configuration Control) signal.

(2) The embodiment above shows only examples of the frame structure, the contents of the TPS block, the number of the bits of the TPS block, the number of the TPS carriers and the arrangement of the TPS carrier frequencies. Thus, they are not necessarily as they are explained.

For example, in the case the number of the bits of the control information (i.e. the TPS block) is M and the number of carriers used for the transmission of the control information for a single OFDM symbol is N, the same rearrangement rule as in the 8K mode is applicable if M=N. Further, if M=a×N (a is an integer that is equal to or more than 2), the same rearrangement rule as in the 2K mode or the 4K mode is applicable. Further, if b×M=N (b is an integer that is equal to or more than 2), the same rearrangement rule as in the 16K mode or the 32K mode is applicable.

(3) The above-described rule for rearranging the bits of the TPS block $s_0$-$s_{67}$ is only a specific example. Thus, it is not necessarily as it is explained.

For example, the rule for rearranging the bits of the TPS block $s_0$-$s_{67}$ may only include the rearrangement rule used by the rotation unit 152. If this is the case, the permutation unit 153 is unnecessary for the transmitter 100, and the inverse permutation unit 232 is unnecessary for the receiver 200.

Also, the rule for rearranging the bits of the TPS block $s_0$-$s_{67}$ may shift the bits by a prescribed number that is two or more of the bits. For example, in the 2K mode, each of the bits of the TPS sub blocks constituting the TPS block may be cyclically shifted by two bits.

Further, although the permutation unit 153 uses the rearrangement rule represented by the [Math. 6] to the [Math. 11] is used in the above explanation to rearrange the TPS block $s'_0$-$s'_{67}$, the permutation unit 153 does not necessarily use the rule represented by the [Math. 6] to the [Math. 11] for the rearrangement. Note that it is preferable that the rearrangement rule performed by the permutation unit 153 is the same as to all the OFDM symbols.

Note that in the transmitter 100, it is preferable that the rule for rearranging the TPS block $s_0$-$s_{67}$ is such that the TPS carriers for carrying the bits of the TPS block $s_0$-$s_{67}$ are changed for each group of OFDM symbols required for transmitting the TPS block $s_0$-$s_{67}$, according to a prescribed rule.

In the case a single TPS block $s_0$-$s_{67}$ is carried by two or more OFDM symbols, it is preferable that the rule for rearranging the TPS block $s_0$-$s_{67}$ is such that each sub block included in the TPS block $s_0$-$s_{67}$ is carried by the same OFDM symbol and the same rule is applied to each sub block.

(4) According to the embodiment above, in the case of the 2K mode and the 4K mode, the TPS block is divided into TPS sub blocks each including successive bits. However, the present invention is not limited this. The TPS block may be divided into TPS sub blocks including arbitrary bits of the TPS block. For example, in the 4K mode, the TPS block may be divided into a TPS sub block that includes odd number bits and a TPS sub block that includes even number bits.

(5) According to the embodiment above, the synchronization word detection unit 251 of the receiver 200 performs the detection of the synchronization word without combining a plurality of TPS blocks. However, the present invention is not limited to this. In view of that the synchronization words are reflected codes, the synchronization word detection unit 251 may perform the synchronization word detection after combining a plurality of TPS blocks.

Although the embodiment above explains the case of the OFDM transmission as an example, the present invention is not limited to this. The present invention is applicable to any multicarrier transmission with use of a plurality of carriers.

(7) Each of the transmitter and the receiver explained in the embodiment above is realized as an LSI (Large Scale Integration), which is a type of integrated circuits. Each circuit may be separately realized a single chip, or all or part of the circuits may be included in a single chip.

The LSI given here as an example may be referred to as an IC (integrated circuit), a system LSI, a super LSI, or an ultra LSI, depending on the degree of integration.

The integration method is not limited to large-scale integration, and may be realized by a dedicated circuit or a general-purpose processor. Alternatively, a FPGA (field programmable gate array) programmable after the LSI has been manufactured, a reconfigurable processor capable of reconfiguring the connections and settings of circuit cells within an LSI, or the like, may be employed.

Also, if integration technology that replaces large-scale integration becomes available as a result of advances in semiconductor technology or the advent of derivative technology, the integration of the functional blocks may naturally be performed using this technology. For example, the application of biotechnology or the like in this area is a possibility.

INDUSTRIAL APPLICABILITY

The present invention is applicable to the digital broadcasting standards for transmission of the transmission parameter information, and also to digital communications with use of mobile telephones, wireless LAN, power line communications, xDSL, and so on.

The invention claimed is:

1. A transmitter that modulates for each symbol period a plurality of carriers that includes a carrier group consisting of a plurality of prescribed carriers, and repeatedly transmits control information in cycles by using the carrier group, the transmitter comprising:
    a transmission unit operable to transmit multiple-bit binary data of the control information in each symbol period, so as to transmit the control information once in each of the cycles that includes at least one symbol period; and
    a transmission control unit operable to control the transmission unit to switch, within the carrier group, for each of the cycles, carriers of bits of the control information, according to a prescribed rule.

2. The transmitter of claim 1, wherein the prescribed rule is to cyclically shift the carriers of the bits of the control information for each of the cycles.

3. The transmitter of claim 1, wherein the prescribed rule includes a first rule that is to cyclically shift the carriers of the bits of the control information for each of the cycles, and a second rule that is common to each symbol period and is to rearrange, with respect to a frequency direction, the bits of the control information arranged according to the first rule.

4. A transmitter that modulates for each symbol period a plurality of carriers that includes a carrier group consisting of a plurality of prescribed carriers, and repeatedly transmits control information in cycles by using the carrier group, the transmitter comprising:
    a transmission unit operable to transmit all bits of binary data of the control information in each symbol period, so as to transmit the control information one or more times in each symbol period; and
    a transmission control unit operable to control the transmission unit to switch, within the carrier group, for each symbol period, carriers of bits of the control information, according to a prescribed rule.

5. The transmitter of claim 4, wherein the prescribed rule is to cyclically shift all or part of the carriers of the bits of the control information for each symbol period.

6. The transmitter of claim 4, wherein the prescribed rule includes a first rule that is to cyclically shift all or part of the carriers of the bits of the control information for each symbol period, and a second rule that is common to each symbol period and is to rearrange, with respect to a frequency direction, the bits of the control information arranged according to the first rule.

7. A multicarrier transmission method, performed by a transmitter including a transmission unit and a transmission control unit, for modulating for each symbol period a plurality of carriers that includes a carrier group consisting of a plurality of prescribed carriers, and repeatedly transmits control information in cycles by using the carrier group, the multicarrier transmission method comprising:
    a transmission step, performed by the transmission unit, of transmitting multiple-bit binary data of the control information in each symbol period, so as to transmit the control information once in each of the cycles that includes at least one symbol period; and
    a transmission control step, performed by the transmission control unit, of controlling the transmission step to switch, within the carrier group, for each of the cycles, carriers of bits of the control information, according to a prescribed rule.

8. A multicarrier transmission method, performed by a transmitter including a transmission unit and a transmission control unit, for modulating for each symbol period a plurality of carriers that includes include a carrier group consisting of a plurality of prescribed carriers, and repeatedly transmits control information in cycles by using the carrier group, the multicarrier transmission method comprising:
    a transmission step, performed by the transmission unit, of transmitting all bits of binary data of the control information in each symbol period, so at to transmit the control information one or more times in each symbol period; and
    a transmission control step, performed by the transmission control unit, of controlling the transmission step to switch, within the carrier group, for each symbol period, carriers of bits of the control information, according to a prescribed rule.

9. A receiver that receives control information from a transmitter that modulates for each symbol period a plurality of carriers that includes a carrier group consisting of a plurality of prescribed carriers and repeatedly transmits the control information in cycles by using the carrier group, the receiver comprising:
 a receiving unit operable to receive the control information that is transmitted in such a manner that multiple-bit binary data of the control information is transmitted in each symbol period so that the control information is transmitted once in each of the cycles that includes a prescribed number of symbol periods, wherein the transmission of the control information is controlled such that carriers of bits of the control information are switched within the carrier group, for each of the cycles, according to a prescribed rule; and
 a reconstructing unit operable to reconstruct the control information received by the receiving unit, according to the prescribed rule.

10. A receiver that receives control information from a transmitter that modulates for each symbol period a plurality of carriers that includes a carrier group consisting of a plurality of prescribed carriers and repeatedly transmits control information in cycles by using the carrier group, the receiver comprising:
 a receiving unit operable to receive the control information that is transmitted in such a manner that all bits of binary data of the control information are transmitted in each symbol period so that the control information is transmitted one or more times in each symbol period, wherein the transmission of the control information is controlled such that carriers of bits of the control information are switched within the carrier group, for each symbol period, according to a prescribed rule; and
 a reconstructing unit operable to reconstruct the control information received by the receiving unit, according to the prescribed rule.

\* \* \* \* \*